(12) United States Patent
Cota

(10) Patent No.: US 11,059,685 B2
(45) Date of Patent: Jul. 13, 2021

(54) DEVICE FOR FILLING A CONTAINER WITH PARTICULATE MATERIAL

(71) Applicant: T.I.M.E. Global Solution GmbH, Manching (DE)

(72) Inventor: Aldo Cota, Manching (DE)

(73) Assignee: T.I.M.E. Global Solution GmbH, Manching (DE)

( * ) Notice: Subject to any disclaimer, the term of this patent is extended or adjusted under 35 U.S.C. 154(b) by 330 days.

(21) Appl. No.: 16/084,153

(22) PCT Filed: Mar. 31, 2017

(86) PCT No.: PCT/EP2017/057675
§ 371 (c)(1),
(2) Date: Sep. 11, 2018

(87) PCT Pub. No.: WO2017/167957
PCT Pub. Date: Oct. 5, 2017

(65) Prior Publication Data
US 2020/0290828 A1     Sep. 17, 2020

(30) Foreign Application Priority Data
Mar. 31, 2016  (EP) .................................... 16163229

(51) Int. Cl.
*B01J 8/00*        (2006.01)
*B65G 69/04*       (2006.01)

(52) U.S. Cl.
CPC .......... *B65G 69/0441* (2013.01); *B01J 8/002* (2013.01); *B01J 8/003* (2013.01);
(Continued)

(58) Field of Classification Search
CPC .. B01J 8/002; B01J 8/003; B01J 2208/00752; B01J 2208/00769; B01J 2208/00654; B65G 69/0441; B65G 69/0458
See application file for complete search history.

(56) References Cited

U.S. PATENT DOCUMENTS 3,206,044 A    9/1965  Schwichtenberg
3,599,878 A    8/1971  Buschbom et al.
(Continued)

FOREIGN PATENT DOCUMENTS

BE    0899420 A1    7/1984
EP    0482991 B1    6/1995
(Continued)

OTHER PUBLICATIONS

International Preliminary Report on Patentability issued in PCT/EP2017/057675 dated Oct. 4, 2018.
(Continued)

*Primary Examiner* — Lessannework Seifu
(74) *Attorney, Agent, or Firm* — Saul Ewing Arnstein & Lehr LLP; Brian R. Landry; Justin W. Crotty

(57) ABSTRACT

The invention relates to a filling device (1) for filling a container with a particulate material (28). The filling device (1) comprises a supply container (2) that can be filled with the particulate material (28), wherein the supply container (2) has a lower opening (2.2). Moreover, the filling device (1) comprises a radial distribution unit (3), which can be supplied with the particulate material via the lower opening (2.2) of the supply container (2) and which is connected to the supply container (2) in such a way that it can rotate about a rotational axis (A), in order to distribute in the container the particulate material (28) supplied from the supply container (2) to the distribution unit (3). The filling device is characterized in that the distribution unit (3) can be driven by a drive unit (4) that is arranged outside the supply container (2).

20 Claims, 15 Drawing Sheets

(52) U.S. Cl.
CPC ............... *B01J 2208/00654* (2013.01); *B01J 2208/00752* (2013.01); *B01J 2208/00769* (2013.01)

(56) References Cited

U.S. PATENT DOCUMENTS

| | | |
|---|---|---|
| 3,966,124 A | 6/1976 | Sukup |
| 4,972,884 A | 11/1990 | Souers et al. |
| 5,593,268 A | 1/1997 | Peeples et al. |
| 5,735,319 A * | 4/1998 | McNamara ............ B65B 37/12 141/286 |
| 6,923,389 B2 | 8/2005 | Shivvers |
| 2007/0181812 A1 | 8/2007 | Straub et al. |
| 2012/0205007 A1 | 8/2012 | Girard et al. |
| 2013/0025739 A1 | 1/2013 | Cottard et al. |
| 2013/0298507 A1 | 11/2013 | Poussin et al. |

FOREIGN PATENT DOCUMENTS

| | | |
|---|---|---|
| WO | 2005051814 A1 | 6/2005 |
| WO | 2011083222 A1 | 7/2011 |
| WO | 2012076761 A1 | 6/2012 |

OTHER PUBLICATIONS

International Search Report and Written Opinion of the Eraieriaationai Searching Authority issued in PCT/EP2017/057675 dated Jun. 26, 2017.
Unknown, "Montage de Roulements: Regles usuelles", http://www.zpag.net/Technologies_Indistrielles/Roulements_Montage.htm (print date Sep. 17, 2020).
Wikipedia, "Palier (mecanique) II", https://fr.wikipedia.org/wiki/Palier (mecanique) (print date Sep. 21, 2020).
Wikipedia, "Roulement mecanique II", https://fr.wikipedia.org/Roulement mecanique (print date Sep. 17, 2020).

* cited by examiner

DEVICE FOR FILLING A CONTAINER WITH PARTICULATE MATERIAL

CROSS-REFERENCE TO RELATED APPLICATIONS

This application is the U.S. national phase, pursuant to 35 U.S.C. § 371, of PCT international application Ser. No. PCT/EP2017/057675, Mar. 31, 2017, designating the United States and published in German on Oct. 5, 2017 as publication WO 2017/167957 A1, which claims priority under 35 U.S.C. § 119(a) to German patent application No. 16163229.4, filed Mar. 31, 2016. The entire disclosures of the aforementioned patent applications are hereby incorporated herein by reference.

The invention relates to an improved device for filling a container, e.g. a chemical reactor, with a particulate material. The filling device comprises a supply container and a radial distribution unit connected rotatably thereto. A controlled rotary motion is imparted to the distribution device by means of an external drive unit, which does not hinder the filling process. Furthermore, the invention relates to a method for filling a container with particulate filling material with the aid of this filling device according to the invention.

BACKGROUND OF THE INVENTION

Chemical reactors often contain particulate catalyst material which accelerates the desired chemical reactions. The manner in which a reactor is filled with catalyst material has a major influence on the subsequent progress of the chemical reactions that take place in the container. It is particularly important here that the catalyst material should be distributed uniformly and gently in the reactor vessel. In particular, a continuous, uniform, gentle and trouble-free filling process is of great importance.

For carrying out chemical reactions, it is especially the quality of catalyst filling which is of great importance. A homogeneous catalyst bed ensures uniform temperature distribution in the reactor. During the introduction of the catalyst particles, which are often mechanically very sensitive, particles may break apart or catalyst material may be abraded owing to the action of excessive mechanical force. As a result, the catalyst charge is compacted and leads to unwanted pressure losses during the operation of the reactor. With nonuniform filling, there is furthermore the risk of the formation of "hotspots", i.e. zones of undesirably high temperature in the reactor, which impair control of the progress of the reaction. During the filling of reactors with catalyst particles, special attention must therefore be given to the homogeneity of the charge obtained. To achieve this, an effort is made to fill the reactor with the catalyst particles in as gentle a manner as possible.

WO 2005/051814 A1 discloses a device for filling a container with solid particles. Here, the device comprises a distributor, which has channels through which the solid particles enter the container. In this case, the device has a motor, which is arranged within the device. Here, the distributor is connected to the motor and can be driven thereby.

EP 2 648 837 A1 furthermore discloses a device, of the kind also described in WO 2005/051814, for filling a container with solid particles. In this device too, therefore, the motor is arranged within the device. In addition, EP 2 648 837 A1 discloses the arrangement of a diaphragm of complex construction which has a multiplicity of closure flaps. This is intended to ensure that the solid particles are distributed more uniformly in the container.

Finally, EP 0 482 991 B1 discloses a device for filling a container with free-flowing material. Here, the device comprises a supply hopper, a distributor head and means for distributing the free-flowing material. The means for distribution comprise regulating means, by means of which the flow of the free-flowing material can be controlled. This device too comprises a motor, which drives a shaft but is likewise arranged within the device.

U.S. Pat. No. 4,972,884 describes a device for filling a reactor with catalyst particles, although the drive shaft of the drive motor is likewise arranged centrally in the device and hinders the flow of the filling material to the distribution unit.

However, the disadvantage with all these devices is that, as a container is filled with solid particles, these particles impinge unhindered on the internal, centrally arranged drive motor or the drive shaft thereof and can thereby be damaged. Moreover, the throughput volume is unnecessarily reduced by the internal motor or the drive shaft thereof.

US 2012/205007 A1 describes a device for filling a reactor with catalyst particles, wherein a drive motor that is separate from the supply and distribution unit thereof can be provided. This two-part construction makes the device more difficult to handle, is fault-prone and not very space-saving.

SUMMARY OF THE INVENTION

It is therefore the object of the invention to provide an improved filling device of compact construction by means of which gentle filling of a container with particulate material is made possible by largely avoiding damage to the particulate material during the filling process and which can be handled easily and reliably by virtue of its compact construction.

This object is achieved by the filling device in claim 1. Advantageous developments of the filling device form the subject matter of the dependent claims. By virtue of the lower mechanical stress on the particulate filling material which is thereby achieved and the simple handling of the compact device, an increase in the filling rate and hence a further minimization of downtimes of the corresponding technical plant, e.g. a chemical reactor, is made possible owing to a more rapid exchange of catalyst material.

DETAILED DESCRIPTION OF THE INVENTION

A. Preferred Embodiments

Figure 1:
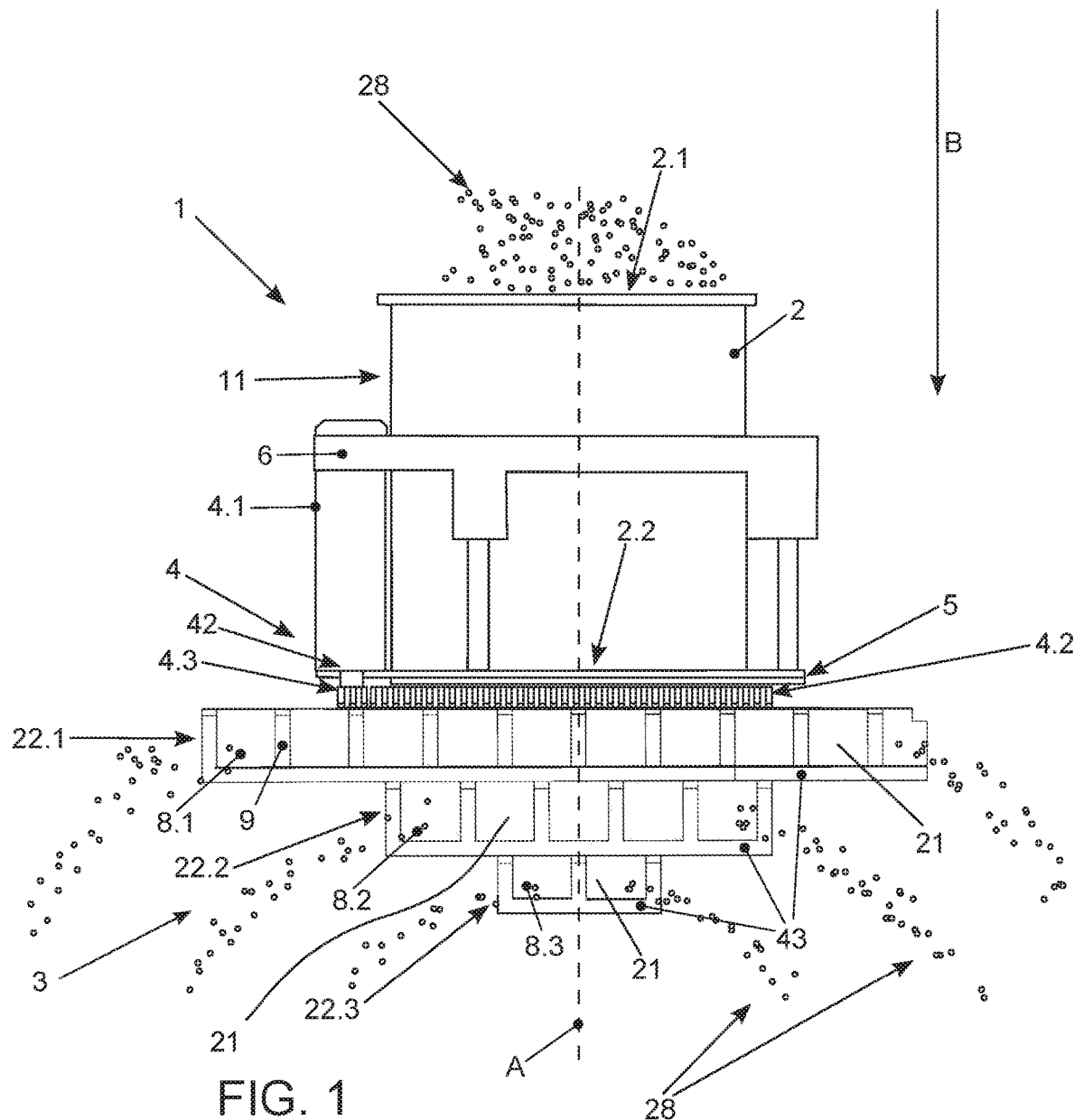
FIG. 1 shows an illustrative embodiment of the filling device according to the invention.

The invention relates, in particular, to the following embodiments:

1. A filling device (1) for filling a container with particulate material (28), comprising
   a supply container (2) that can be filled with the particulate material (28), wherein the supply container (2) has a lower opening (2.2), and
   a radial distribution unit (3), which can be supplied with the particulate material (28) via the lower opening (2.2) of the supply container (2) and which is connected to the supply container (2) in such a way that it can rotate about a rotational axis (A), in order to distribute in the container to be filled the particulate material (28) supplied from the supply container (2) to the distribution unit (3),
   characterized in that
   the distribution unit (3) can be driven by means of a drive unit (4) that is arranged outside the supply container (2).
   In a preferred embodiment, the distribution unit (3) can be driven by means of a drive unit (4) that is arranged outside the supply container (2), which drive unit comprises a motor (4.1), a first (4.2, 4.2a) and a second drive means (4.3, 4.3a). In this case, the motor (4.1) is secured on an outer wall of the supply container (2) and is arranged laterally offset with respect to the rotational axis (A) of the distribution unit (3). A particularly compact construction of the entire device with surprisingly little susceptibility to faults is thereby made possible. The overall diameter of the upper part of the device comprising the supply container and the drive unit can thereby be kept as small as possible and, in particular, is less than the maximum diameter of the rotatable distribution unit arranged thereunder.

2. The filling device (1) according to embodiment 1, characterized in that
   the drive unit (4) is arranged on an outer wall (11) of the supply container (2) and, in particular, is secured releasably thereon by means of a, preferably annular, holding means (6), which surrounds the supply container (2).

3. The filling device (1) according to embodiment 1 or 2, characterized in that
   the drive unit (4) comprises a motor (4.1), which is coupled to a first drive means (4.2, 4.2a), which is rotatable about the rotational axis (A), wherein the first drive means (4.2, 4.2a) is connected to the distribution unit (3).

4. The filling device (1) according to embodiment 3, characterized in that
   a second drive means (4.3) engages in the first drive means (4.2), thus allowing a torque of the second drive means (4.3) to be transmitted to the first drive means (4.2).

5. The filling device (1) according to embodiment 3, characterized in that
   the second drive means is a drive belt pulley (4.3a), which drives the first drive means, which is designed as a driven belt pulley (4.2a), via a drive belt (46), thus allowing a torque of the second belt pulley (4.3a) to be transmitted to the first belt pulley (4.2a).

6. The filling device (1) according to embodiment 4 or 5, characterized in that
   the first drive means (4.2, 4.2a) is arranged between the supply container (2) and the distribution unit (3), and
   the torque of the second drive means (4.3, 4.3a) is transmitted to the distribution unit (3) by means of the first drive means (4.2, 4.2a).

7. The filling device (1) according to one of the preceding embodiments, characterized in that
   the distribution unit (3) has a multiplicity of sectors (8), which are oriented radially outward from the rotational axis (A) and which are separated from one another by separating elements (9), wherein the separating elements (9) extend radially outward with respect to the rotational axis (A), with the result that an outlet opening (21) for the particulate material (28) is formed between in each case two separating elements (9).

8. The filling device (1) according to embodiment 7, characterized in that
   the sectors (8.1, 8.2, 8.3) have a sector opening (8.1a, 8.2a, 8.3a) that is open in the direction of the supply container (2), thus allowing the sectors (8) to be filled with the particulate material (28).

9. The filling device (1) according to embodiment 7 or 8, characterized in that
   the distribution unit (3) is of modular construction, wherein the distribution unit (3) has at least two concentric modules (22.1, 22.2, 22.3), in particular 2, 3, 4 or 5, preferably 3 modules, which each comprise sectors (8), wherein the modules are arranged one above the other in a stacked configuration and the outlet openings (21) of the first module (22.1) are arranged in a first, upper plane and
   the outlet openings (21) of the second module (22.2, 22.3) are arranged in a second, lower plane, wherein the upper module (22.1) has a larger diameter than the one or more lower modules (22.2, 22.3).

10. The filling device (1) according to embodiment 9, characterized in that
    each of the modules (22.1, 22.2, 22.3) has at least one section (29.1, 29.2, 29.3) which is open in the direction of the supply container (2), thus allowing the modules (22.1, 22.2, 22.3) to be filled with the particulate material (28).
11. The filling device (1) according to one of embodiments 6 to 9,
characterized in that
the modules (22.1, 22.2, 22.3) each have a base plate (43), wherein the separating elements (9) are set up substantially vertically on the base plates (43), thereby forming the sectors (8). In particular, the base plate (43) and the separating elements (9) can be of one-piece design.
12. The filling device (1) according to embodiments 6 to 10, characterized in that
the sectors (8) of the distribution unit (3) have flexible, radially outward-oriented extensions (48, 51).
13. The filling device (1) according to embodiments 10 and 11,
characterized in that
the flexible, radially outward-oriented extensions (48, 51) comprise first extensions (48), which, particularly during operation, extend substantially horizontally in a plane defined by the base plate (43) of the first (22.1) and/or second module (22.2, 22.3), and/or second extensions (51), which extend substantially perpendicularly to the plane defined by the base plate (43) of the first (22.1) and/or second module (22.2, 22.3).
14. The filling device (1) according to embodiment 11, characterized in that
the first extensions (48) are arranged at the outer edge of the base plate (43) of the first (22.1) and/or second module (22.2, 22.3).
15. The filling device (1) according to embodiment 11, characterized in that
the second extensions (51) are arranged at the outer edge of the separating elements (9).
16. The filling device (1) according to one of embodiments 10 to 13,
characterized in that
the extensions (48, 51) are manufactured from a flexible material.
17. The filling device (1) according to embodiment 11 or 12, characterized in that
the first extensions (48) form a flexible single- or multi-piece outer ring around the first (22.1) and/or second module (22.2, 22.3).
18. The filling device (1) according to one of embodiments 11 to 15,
characterized in that
the first extensions (48) are of tab-type design and/or the second extensions (51) are of brush-type design.
In the state of rest of the device, the first extensions (48) described above in embodiments 12 to 18 can be arranged with the free end hanging down. During the operation of the filling device (1), these extensions then align themselves substantially horizontally.
19. The filling device (1) according to one of the preceding embodiments,
characterized in that
the filling device (1) comprises at least one means (5), arranged between the supply container (2) and the distribution unit (3), for controlling a flow of the particulate material (28) to the distribution unit (3).
20. The filling device (1) according to embodiment 11, characterized in that
the flow control means (5) comprises a disk (13.1, 38.1) having at least one opening (14.1, 39), wherein the disk (13.1, 38.1) forms a base of the supply container (2), which is arranged at the lower opening (2.2) of the supply container (2).
21. The filling device (1) according to embodiment 11 or 12, characterized in that
the flow control means (5) comprises an opening control means (38.2), which can be moved relative to the disk (38.1) and by means of which the opening (39.1) can be covered in such a way that a variable passage (16) is formed, through which the particulate material (28) can be supplied to the sectors (8) of the distribution unit (3).
22. The filling device (1) according to embodiment 12, characterized in that
the opening control means (38.2) comprises a second disk having at least one opening (40.1) and at least one web (40.2), wherein the opening (39.1) of the disk (38.1) can be at least partially covered by means of the web (40.2) of the second disk (38.2).
23. The filling device (1) according to embodiment 11 or 12, characterized in that
the flow control means (5)
a) comprises a disk (13.1) having at least one opening (14.1), wherein the disk (13.1) forms a base of the supply container (2), which is arranged at the lower opening (2.2) of the supply container (2); and furthermore
b) comprises a releasably secured and therefore exchangeable grid-like disk (47), which partially covers at least one opening (14.1) of the disk (13.1).
24. The filling device (1) according to one of embodiments 11 to 14,
characterized in that
the flow control means (5) comprises at least one actuating unit (12), wherein the actuating unit (12) comprises a servomotor (12.1), which drives a rotatable actuating wheel (12.2), and
the opening control means (38.2) comprises at least one section (41) which has notches (15), into which the actuating wheel (12.2) engages, wherein the position of the opening control means (38.2) relative to the opening (39.1) of the disk (38.1) can be changed by rotating the actuating wheel (12.2).
25. A method for filling a container with a particulate material using a filling device (1) according to one of embodiments 1 to 16.

B. Further Embodiments of the Invention

In particular, the device according to the invention is characterized in that the distribution unit can be driven by means of a drive unit that is arranged outside the supply container. As a result, in contrast to the known devices of the prior art, a situation where the motor is mounted in a disruptive manner within the supply container during the filling process is avoided in a particularly advantageous way. This prevents the particulate material from impinging upon the motor and being damaged as it is introduced into the supply container. Moreover, it is thereby advantageously possible to provide a greater volume for particulate material in the supply container and hence to accelerate the filling process using the same diameter for the supply container.

In one embodiment of the filling device according to the invention, the drive unit arranged outside the supply container comprises a motor, a first and a second drive means. In particular, the drive unit is arranged laterally offset on an outer wall of the supply container, in particular being secured releasably there. The motor of the drive unit is preferably secured on the outer wall of the supply container and arranged laterally offset with respect to the rotational axis of the distribution unit. It is thereby advantageously possible to avoid a situation where bridging elements, e.g. cables or holders for the drive unit, would disrupt the flow of particles within the supply container. This leads to a compact construction of the filling device even though the drive unit is arranged outside the supply container. The rigid connection between the supply container and the drive motor furthermore allows a mode of construction which is surprisingly compact and, at the same time, has a surprisingly low susceptibility to faults.

According to the invention, the distribution unit is rotatably connected to the supply container. As a result, a rotary motion can be imparted in a controlled manner to the distribution unit with the aid of the external drive unit. In this case, the particulate filling material is ejected from the distribution unit into the container to be filled by the action of centrifugal force. Here, the respective distance by which it is thrown can be influenced by means of the speed of revolution or rotation of the distribution unit. The faster the distribution unit rotates, the higher is the speed of the particulate material at an outlet of the distribution unit. The speed at the outlet of the distribution unit in turn influences how far the particles of filling material are ejected into the container. The ejection distance is furthermore dependent on the radius of the individual modules of the distribution unit.

Here, the supply container can be manufactured from materials that are usually used for such devices of the kind in question, e.g. from plastic or metal, especially steel or aluminum, particularly a stainless high-grade steel.

Furthermore, the drive unit comprises a motor, in particular an electric, hydraulic or, preferably, pneumatic motor, which is coupled to a first drive means, which is rotatable about the rotational axis of the distribution unit. In this arrangement, the first drive means is connected to the distribution unit. In particular, the distribution unit is secured directly on the first drive means. The distribution unit can thereby be rotated with the aid of the drive unit. In this case, the speed of the motor is preferably adjustable, in particular being adjustable in stages or in an infinitely variable manner.

In its simplest form, the distribution unit is of substantially plate- or disk-type design and consists essentially of a plate, which forms a base plate of the distribution unit. The distribution unit prevents particulate material introduced into the supply container during the filling process from falling unhindered into the container to be filled without being distributed to a significant extent therein, the material instead being deflected sideways by the unit radially toward the outside and thereby being distributed in the container.

A second drive means is furthermore formed on the motor, said drive means communicating with the first drive means, e.g. engaging directly therein or being connected in a drivable manner by a further drive means, thus allowing a torque of the second drive means to be transmitted to the first drive means. It is thereby possible in a particularly advantageous manner to implement a rotatable drive of the distribution unit, despite the arrangement of the drive unit outside the supply container.

In particular, the first drive means is arranged between the supply container and the distribution unit, and the torque of the second drive means is transmitted via the first drive means to the distribution unit, which is connected to the first drive means. For example, driving is accomplished via gearwheels and, in this case, the first drive means comprises a gearwheel and the second drive means comprises a pinion, which engages in the gearwheels.

In particular, however, the drive is designed as a belt drive and, in this case, the first drive means comprises a driven belt pulley and the second drive means comprises a driving belt pulley, wherein the belt pulleys communicate by means of a drive belt. Here, the belt drive designed according to the invention can be designed in a manner known per se in various ways, e.g. as a flat belt, V-belt, poly-V-belt, toothed belt or round-section belt drive, as required. In this case, the belt guidance can be of crossed, half-crossed (quarter turn) or, preferably, open design in a known manner. The belt drive can optionally have a tensioning facility and can be designed in a manner known per se as a structurally pretensioned transmission, tensioning roller transmission or tension shaft transmission. The belt drive can furthermore be designed to be adjustable in one stage or two stages or multiple stages. In the case of multi-stage drives, the driving belt pulley can be designed as a stepped pulley, for example.

In another embodiment, the distribution unit, in particular the one or more base plates thereof, has a multiplicity of sectors, which are oriented radially outward, i.e. in the direction of the inner wall of the container to be filled, from the rotational axis of the distribution unit. The sectors are separated from one another by radially arranged separating elements (in particular partition walls). In this case, the separating elements stand substantially perpendicularly on the base plate and extend radially toward the outside with respect to the rotational axis, being curved in or counter to the direction of rotation for example, with the result that an outlet opening for the particulate material which has entered the sectors is formed between in each case two separating elements. By means of the division of the distribution unit into sectors and the separation of the sectors by separating elements, it is advantageously possible to divide the particulate material into portions in the desired manner, preferably uniformly, in the distribution unit itself. By means of portionwise division of particulate material in the distribution unit, it is also possible here to promote uniform distribution into the container and thus as homogeneous a construction as possible of the material layer in the reactor vessel. The separating elements can be shaped in any desired manner but, in particular, are configured as substantially vertical partition walls and are placed vertically on the base plate of the distribution unit. As a result, the segments formed in this way have a U-shaped cross section. Moreover, a standard volume in the sectors can be set by means of uniform radial distribution of the partition walls. The sectors can furthermore be of completely or at least partially open design toward the top.

Here, the sector lengths can be of the same length, for example. In this case, the base plate of the distribution unit is of circular-disk-shaped configuration. As an alternative, the sector lengths can differ from one another. This is the case, for example, when the base plate of the distribution unit has a spiral outline. This means that the distance between the peripheral line of the base plate and the rotational axis increases. The base plate can be composed of two half-spirals, for example. Whether the sector lengths are the same or different is therefore dependent on the geometry of the base plate.

The number and size of the sectors are a matter of free choice but are dependent on the size of the particles of the particulate filling material. The larger the particles, the larger the sectors should also be in order to prevent clogging of the distribution unit and in order to enable a sufficient number of material particles to be accommodated.

The distribution unit can be manufactured from materials that are usually used for such devices of the kind in question, e.g. from plastic or metal, especially plastic, e.g. polyethylene.

Moreover, at least one intermediate separating element, which divides the sectors into subsectors, can be arranged in each of the sectors. In this case, the intermediate separating elements can likewise be substantially vertical intermediate partition walls. The intermediate separating elements can furthermore have a lower height than the separating elements. By dividing the sectors into subsectors, it is advantageously possible to ensure even more uniform distribution of the particulate material in the sectors themselves.

In a preferred embodiment of the invention, the sectors of the distribution unit have a sector opening which faces in the direction of the supply container, thus enabling the sectors of the distribution device, which rotates during the filling process, to be filled with the particulate material. The sectors thus receive the particulate material from the interior of the supply container. In this way, the particulate material is supplied to the sectors from above. In this case, filling can take place discontinuously or in portions but especially in a continuous manner.

The distribution unit is furthermore in one piece, i.e. is constructed from a single distribution module or is of multi-part modular construction. In this case, it can have at least two, e.g. 2, 3, 4 or 5, in particular 3, concentric modules, which each comprise a multiplicity of the radial sectors described above. The modules are arranged one above the other in a stacked configuration and along the rotational axis of the distribution device. The modules are preferably connected releasably, e.g. screwed, to one another. The individual modules of the distribution device thus rotate at the same speed of rotation during operation. In the case of a modular construction of this kind, the outlet openings of the sectors of the first module are arranged in a first plane, and the outlet openings of the sectors of the second module are arranged in a second plane, wherein the first plane is arranged above the second plane. The modules have diameters of different sizes, for example. The upper module preferably has a larger diameter than the lower module. This prevents particulate material from being ejected from the upper module onto the lower module first of all and only then being ejected into the container.

The modules are of annular design, for example. Each of the modules then has a different inside diameter, wherein the inside diameter of the first, upper module is larger than the inside diameter of the second, lower module. In corresponding fashion, the inside diameter of each further, following module tapers. This ensures that each sector is open toward the inside of the supply container and can thus receive particulate material in portions. Furthermore, the outside diameter can increase continuously, starting from the rotational axis, with the result that a module has a spiral geometry. Moreover, the outside diameters of the individual sectors can change in stages, with the result that shorter and longer sectors alternate along the module circumference.

In particular, the outside diameter of the first, upper module is larger than the outside diameter of the second module. It is thereby advantageously possible to prevent all the particulate material being thrown out of the distribution unit by the same distance. By this means too, therefore, uniform distribution of the particulate material in the container is ensured.

Moreover, each of the modules can have at least one section which is open in the direction of the supply container arranged thereabove, thus allowing the modules to be filled with the particulate material. These sections are then formed, in particular, by the sectors open in the direction of the supply container.

It is not possible to make an arbitrary choice in respect of the size of the radial diameter of the distribution unit since the filling device must be introduced via openings in the reactors and internal fittings, such as intermediate-level plates, situated therein which are kept as small as possible.

In another embodiment of the filling device according to the invention, the sectors of the distribution unit have flexible, radially outward-oriented extensions. Here, flexible means, in particular, that the extensions can be bent out of the plane which is defined by the base plates of the modules. Thus, the flexible extensions can be bent upward, i.e. counter to the falling direction, or downward, i.e. in the falling direction of the filling material particles. In this arrangement, the flexible extensions make it possible to enlarge the base areas of the modules. As a result, the diameter of the annular modules is no longer limited by the size of the openings of the container which is to be filled with particulate material. By virtue of the fact that the extensions are of flexible design, they can bend as they are introduced into the container and can reassume their initial state within the container. By means of the enlargement of the radial diameter brought about in this way, a further improvement of the filling process is achieved. The maximum ejection distance of the distribution unit is increased or the same ejection distances can be achieved with a lower rotational speed.

In particular, the flexible, radially outward-oriented extensions comprise first extensions, which extend substantially horizontally in the plane defined by the base plate of the first and/or second module. As an alternative or in addition, the extensions can also comprise second extensions, which extend substantially perpendicularly to the planes defined by the base plate of the first and/or second module.

The first extensions are preferably arranged at the outer edge of the base plate of the first and/or of further modules. In particular, the second extensions at the outer edge of the separating elements of the first and/or of the further modules. This arrangement of the extensions at the outer edges either of the base plate or of the separating elements contributes to a further increase in the compactness of the filling device. Moreover, the sectors are extended.

The extensions can furthermore be manufactured from a flexible material. The first extensions can be manufactured from rubber or other rubber-elastic plastics, for example, and the second extensions can be manufactured from flexible plastic, e.g. plastic bristles, for example.

In one embodiment, the first extensions form a flexible single- or multi-piece outer ring around the first and/or the further modules. If the outer ring is of multi-piece design, a slot is formed between in each case two adjoining extensions, for example. The multi-piece design contributes to the outer ring being even more flexible. In particular, the first extensions are of tab-type design and/or the second extensions are of brush-type design.

In another embodiment, the filling device comprises a means, arranged between the supply container and the distribution unit, for controlling a flow of the particulate material to the distribution unit. A flow control means of this kind is used to ensure that no blockages occur in the distribution unit during the supply of the particulate material. Moreover, the flow control means ensures particularly uniform distribution of the particulate material in the distribution unit and thus ultimately uniform distribution of the particulate material in the container.

The flow control means comprises, in particular, a disk having at least one passage opening, the size of which is variable, in particular adjustable, wherein the disk forms a base of the supply container, which is arranged at the lower opening of the supply container. Here, the shape of the disk is matched to the shape of the supply container. If, therefore, the supply container is a circular cylinder, the disk is a circular disk, which is arranged as a base of the supply container in such a way that it completely covers the lower opening of the supply container. However, the at least one opening in the disk makes it possible nevertheless for particulate material to enter the distribution unit.

In a first embodiment, the flow control means additionally comprises at least one grid-like disk, which, to optimize the respective filling process, is usually chosen, from a set of pre-produced grid-like disks for example, before the start of filling. It is placed, preferably from above, on the first, lower disk forming the base of the supply container, having at least one but preferably a multiplicity of concentrically arranged, predefined passage openings. This allows optimum setting of the flow rate of the respective filling material which is supplied to the individual modules of the distribution unit (and to the sectors of said modules). In this case, the concentric annular webs of the selected grid-like disk are designed in such a way that they partially cover the passage openings of the first disk and thus reduce the flow rate of filling material for the individual modules of the distribution unit in a predefined manner. Sector-wise adjustment during the filling process is not required. As a result, it is possible to provide a filling device of very much simpler construction which, by virtue of the simple-to-exchange interchangeable disks, is just as versatile to use and provides just as reliable filling results of high-quality as other filling devices, described herein, with external actuating devices for changing the flow rate during the respective filling process.

In particular, an interchangeable disk of this kind comprises annular, concentrically arranged webs and radial webs arranged therebetween. The grid structure thus formed is arranged in such a way over the base disk of the filling device that the annular webs at least partially cover the openings of the base disk.

By means of the respective width of the annular webs of the grid-like disk, the sizes of the effective passage openings for the filling material are determined. In this case, the widths of the annular webs can be equal or different and are chosen in such a way that they cover 1 to 99%, e.g. 5 to 50 or 10 to 30%, of the openings in the base disk. For example, the annular webs cover 10 or 20% of these openings, with the result that the passages then have a size of only 90 or 80% of the size of the original opening in the base disk. If the intention is to cover a different percentage of the openings of the base disk, the grid-like disk is replaced with a different grid-like disk, the annular webs of which have a width corresponding to the desired degree of covering. In this way, the quantity of filling material supplied to the individual sectors or modules of the distribution unit can be preset to match requirements. A set of different interchangeable disks is preferably pre-produced, from which one specific grid-like disk is selected and inserted into the device according to the invention in accordance with the significant parameters of a specific filling process, e.g. the type of particles of filling material, the filling rate, the geometry of the container to be filled (e.g. a reactor), before the start of the filling process, in this way enabling an optimum filling result to be guaranteed.

The grid-like disk is preferably connected releasably to the base disk. For example, it can be connected to the base disk by means of screwed joints. Another possibility is to form at least two upward-pointing pegs on the base disk, which engage in corresponding recesses in the grid-like disk or grid-like disks. In this way, all the disks of a set of interchangeable disks can be connected releasably to the base disk in the same way.

In another embodiment, the flow control means comprises an opening control means, which can be moved relative to the base disk and by means of which the opening (openings) of the base disk can be covered in such a way that a passage that can be set in a variable manner is formed, through which the particulate material can be supplied to the sectors of the distribution unit in a controlled manner and in a manner which allows regulation during the filling process. It is thereby advantageously possible to provide a passage of which the size can be changed, by means of which the throughflow of particulate material can be controlled actively (e.g. manually or electrically).

In one embodiment thereof, the opening control means comprises a second disk having at least one opening and at least one web. In this case, the opening of the first disk can be at least partially covered by means of the web of the second disk. In this very simple embodiment of the flow control means, two disks of mutually complementary design can be moved, in particular rotated, relative to one another. As a result, the size of a passage can be determined through a simple rotation of the second disk relative to the first disk.

In yet another embodiment, the opening control means comprises a plurality of shutters, wherein one shutter in each case can have the size of one sector opening of the distribution unit. As an alternative, it is also possible for a plurality of shutters jointly to have the size of one sector opening. It is thereby possible to close individual sectors or groups of sectors of the distribution unit individually and independently of one another. This, in turn, allows fine control of the throughflow of the particulate material to the distribution unit. One embodiment of a variable, manually adjustable flow control means of this kind is described in detail in US2013/0298507, for example, to which attention is hereby drawn.

In another embodiment, the flow control means comprises at least one actuating unit, by means of which a position of the above-described opening control means can be adjusted relative to the opening or openings of the first disk. By means of an actuating unit of this kind, the size of the passage and hence the through flow of particles can be regulated externally in a simple manner.

In one embodiment thereof, the actuating device comprises, in particular, a servomotor, which drives a rotatable actuating wheel. The opening control means comprises at least one section which has notches, into which the actuating wheel engages. In this case, the position of the opening control means, that is to say, in particular, the second disk or of the shutters, relative to the opening of the disk can be changed by rotating the actuating wheel. The use of a servomotor enables the additional disk or the shutters to be adjusted, in particular electrically. It is thereby possible to implement fine adjustment of the size of the passage in a simple manner.

In another embodiment of the filling device according to the invention, it is furthermore possible additionally to arrange a guide in the supply container of said filling device, said guide being secured on the side wall of the container, for example, and guiding the particulate material through the supply container to the distribution unit. This prevents the particulate material from passing through the supply container at high speed during the filling process and impinging unhindered on the flow controller or the distribution unit and being damaged in the process. The guide advantageously ensures that the particulate material can be supplied undamaged to the distribution unit and is distributed more uniformly between the sectors. Irrespective of the material of the supply container, the guide can be manufactured from the same materials as said container.

Here, the guide comprises, in particular, a baffle formed in a spiral between the upper and the lower opening of the supply container. In this case, a guide of this kind can form at least one or more spiral turns over the length of the supply container. Moreover, the spiral baffle can be of any desired width, with the result that it completely or partially covers the distribution unit in the interior of the supply container in plan view.

The baffle can furthermore also slope toward the longitudinal axis of the supply container or counter to the falling direction of the particles.

Furthermore, the guide can also comprise a plurality of blade-shaped guide elements which are arranged offset in the supply container, which completely or partially cover the distribution unit in the interior of the supply container in plan view and prevent the particles from passing freely through the supply container and thus slow down the speed of passage.

Finally, it is also conceivable to form fall-damping elements in a fixed manner in the interior of the supply container or to introduce them during the filling process, as known from the prior art. In EP-A-1 749 568, three-dimensional mesh structures that allow particles through are described, for example; EP-A-0 588 999 and U.S. Pat. No. 6,467,513 disclose brush-shaped fall-damping elements. Attention is hereby explicitly drawn to the disclosure in these documents.

The invention furthermore relates to a method for filling a container with a particulate material using a filling device as described herein.

The invention will now be explained in detail by means of illustrative embodiments with reference to the figures but without restricting the invention to said embodiments.

An illustrative embodiment of the filling device 1 according to the invention is explained with reference to FIG. 1.

The filling device 1 comprises a supply nozzle or supply container 2, which can be filled with particulate material 28. During the filling process, this can be arranged in the container to be filled, e.g. a chemical reactor. The particulate material 28 comprises catalyst particles, which are introduced in a controlled manner from above into the supply container in the filling direction B, e.g. via a flexible hose.

The supply container 2 furthermore has an upper opening 2.1 and a lower opening 2.2. The particulate material 28 is introduced into the supply container 2 in filling direction B through the upper opening 2.1 of the supply container 2. The particulate material 28 can exit the supply container 2 through the lower opening 2.2. Here, the side wall of the supply container 2 is designed as a cylinder open at the top and bottom.

A flow control means 5 is arranged at the lower opening 2.2. In particular, this is arranged in such a way that it can be actuated, more specifically in such a way that the throughflow of the particulate material 28 which leaves the supply container 2 via the lower opening 2.2 of the supply container can be controlled by means of the flow control means 5. Here, the throughflow is defined as the quantity of particulate material 28 which leaves the supply container 2 per unit time.

Moreover, the filling device 1 comprises a drive unit 4, with the aid of which the distribution unit 3 can be driven, in particular a rotary motion about the rotational axis A thereof can be imparted to said unit in a controlled manner.

The drive unit 4 comprises a motor 4.1. The motor 4.1, in turn, is coupled to two drive means 4.2 and 4.3. In this embodiment, the first drive means 4.2 is designed as a gearwheel and the second drive means 4.3 is designed as a pinion.

In the example under consideration, the motor 4.1 is a pneumatic motor, i.e. a compressed air motor. The compressed air motor comprises a piston, to which rotation is imparted by inflowing compressed air. This rotation is transmitted by a piston rod, to the lower end of which the pinion 4.3 is attached. The pinion 4.3, in turn, engages in the gearwheel 4.2. The rotation of the motor 4.1 is therefore transmitted via the pinion 4.3 to the gearwheel 4.2, the gearwheel 4.2 thus being rotatably connected to the motor 4.1 by means of the pinion 4.3 and the piston rod.

The motor 4.1 is secured on the outside of the side wall 11 of the supply container 2 by means of a holding means 6.

The gearwheel 4.2 is furthermore connected to the distribution unit 3. The rotary motion of the gearwheel 4.2 is thus transmitted to the distribution device 3.

The flow control means 5 has a hole or a bore 42, through which the piston rod of the motor and the pinion 4.3 are passed. It is thereby possible to ensure stable fixing of the flow control means 5 between the supply container 2 and the distribution unit 3.

The distribution unit 3 has three concentric annular modules 22.1 to 22.3. In this arrangement, the three modules 22.1 to 22.3 are each formed by a base plate 43, on which separating elements 9 are placed substantially vertically. The separating elements form sectors 8.1 to 8.3 in each plane, and these, in turn, form outlet openings 21.

Here, the modules 22.1 to 22.3, which are of annular design for example, are arranged one above the other in a stacked configuration. This has the effect that outlet openings 21 formed by the sectors 8 of the first 22.1, second 22.2 and third annular module 22.3 are situated in three different planes.

The securing of the distribution unit 3 on the filling device 1 is explained with reference to FIGS. 2a and 2b.

The fixing element 36 is arranged underneath the third annular module 22.3. This has standing feet 36.1, which enable the filling device 1 to be set down when it is removed from the container for servicing, for example. Each of the three modules 22.1 to 22.3 and the fixing element 36 have one or more fastening holes. The modules 22.1 to 22.3 and the fixing element 36 are arranged one above the other in such a way that the holes are directly above one another. This enables a screw 31 to be passed through the holes. The screw 31 is then secured on the side of the fixing element 36 by means of a nut 32. Here, the fastening of the three modules 22.1 to 22.3 to one another and to the fixing element 36 by means of a screw 31 and a nut 32 can take place at several locations, in particular at three locations, in a manner uniformly distributed over the distribution unit 3.

In addition, the third module 22.3 and the fixing element 36 have at least one second fastening hole. By virtue of the arrangement of the third module 22.3 relative to the fixing element 36, the second holes are also arranged directly above one another. The second holes furthermore have threads. A screw 30 is then screwed through the holes and held fast in the third module 22.3 and the fixing element 36 by means of the threads. The distribution unit 3 is thereby secured in a more stable way on the rest of the filling device 1. This fastening can also be distributed uniformly over the third module 22.3 and the fixing element 36 at several locations.

To secure the distribution unit 3 on the supply container 2, the flow controller 5 in this embodiment has a central, rigid axle 34 of circular cross section, which is provided with a screw thread at both ends. Here, the axle 34 is arranged in such a way relative to the supply container 2 that it passes through the rotational axis A. In particular, the rigid axle 34 extends downward, starting from the flow controller 5. Moreover, the flow controller 5 has in the center a hole through which the upper threaded end of the axle 34 passes. As a result, the axle 34 reaches into the supply container 2 and is there fastened, in particular screwed fast, from above by means of an upper nut 45.

A rotary bearing 35 is arranged at the lower end of the axle 34 and is connected to the axle in such a way that the rotary bearing 35 can be rotated about the rigid axle 34.

Figure 2A:
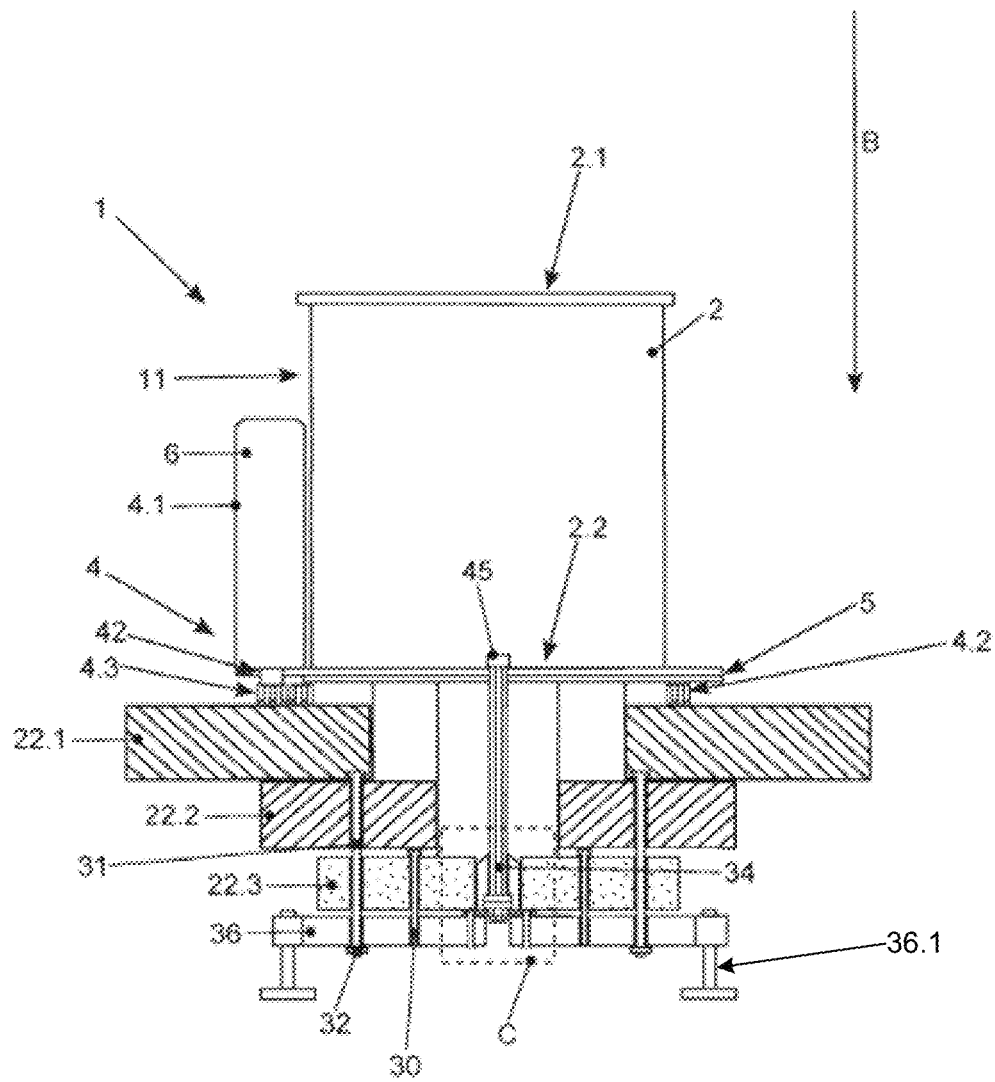
FIG. 2a shows a section through the filling device according to the invention from FIG. 1.
Figure 2B:
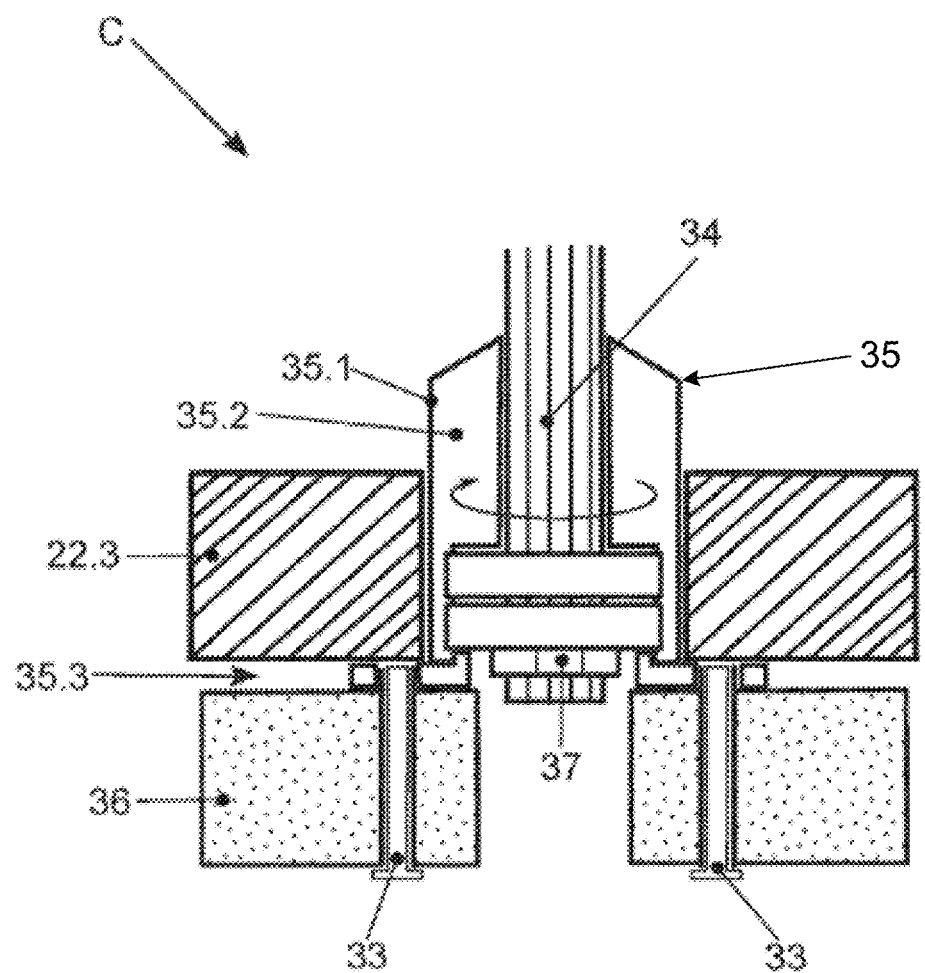
FIG. 2b shows an enlarged view of region C in FIG. 2a, FIG. 3a shows an illustrative embodiment of a drive by drive means designed as gearwheels, and the arrangement of said drive means relative to one another.

To better illustrate the lower section of the axle 34 with the rotary bearing 35, section C from FIG. 2a is illustrated on a larger scale in FIG. 2b. Here, the rotary bearing 35 comprises three schematically illustrated components 35.1 to 35.3. In particular, the rotary bearing 35 comprises an outer, rotatable, e.g. sleeve-shaped, element 35.1 which tapers approximately conically upward and which, in the lower end thereof, has a recess, into which an annular ball bearing 35.2 is fitted, said bearing surrounding a lower, tapered section of the axle 34 with a positive fit. The annular ball bearing 35.2 comprises a housing with an annular outer wall and an annular inner wall. In particular, the outer ring of the ball bearing housing is fitted positively into the lower recess of element 35.1. For example, these two parts can be adhesively bonded to one another. The fixing element 35.3, which is designed as a flange, secures the seating of the ball bearing from below by pressing against the annular outer wall of the latter. The ball bearing 35.2 is furthermore pushed onto the lower, tapered section of the axle 34 until its inner wall touches a stop (offset), which is likewise formed on the axle 34 and which is not shown in FIG. 2b. The inner wall preferably surrounds the lower, tapered end of the axle 34 with a positive fit to such an extent that the lower screw thread of the axle 34 projects from the ball bearing 35.2 sufficiently to enable the lower nut 37 to be screwed on until it strikes the inner ring of the ball bearing housing, without impairing the rotary motion of the sleeve 35.1 and of the flange 35.3 connected thereto.

The flange 35.3 furthermore has a central opening, which is dimensioned in such a way that the lower end of the axle 34, which is provided with a screw thread, can be screwed to the nut 37.

Rotary bearings 35 of this kind are described in EP 2 851 575 A1, for example, which is hereby incorporated by reference into the present application. Suitable rotary bearings can also be obtained from SKF Deutschland.

The flange 35.3, in turn, has one or more lateral holes with an internal thread, and the fixing element 36 has the same number of third holes. The two elements 35.3 and 36 are arranged in such a way relative to one another that these holes lie directly one above the other. Fastening screws 33 are then once again passed through the holes in the fixing element 36 and screwed to the threaded holes of the flange 35.3. The rotary bearing 35 is thereby secured on the fixing element 36, thus allowing it to be rotated about the axle 34 together with the annular modules 22.1 to 22.3 (cf. FIG. 2a), likewise secured thereon, of the distribution unit 3.

This variant of the assembly of a filling device 1 according to the invention makes it possible for the entire distribution unit 3 to be secured on the supply container 2 in such a way as to be rotatable about the axle 34.

However, in another embodiment (not shown) of the device according to the invention (as shown in FIG. 1), the distribution unit 3 can be secured on the supply container 2 by a procedure in which the distribution unit 3 is screwed only to the drive means (cf. 4.2 and 4.2a in the following FIGS. 3a and 3b), making the central axle 34 and the rotary bearing 35 superfluous. For example, the upper annular module 22.1 illustrated in FIG. 2a can be secured by means of screws at the screw fastening points 18 (illustrated in FIGS. 3a and 3b) of the drive means 4.2 and 4.2a.

Figure 3A:
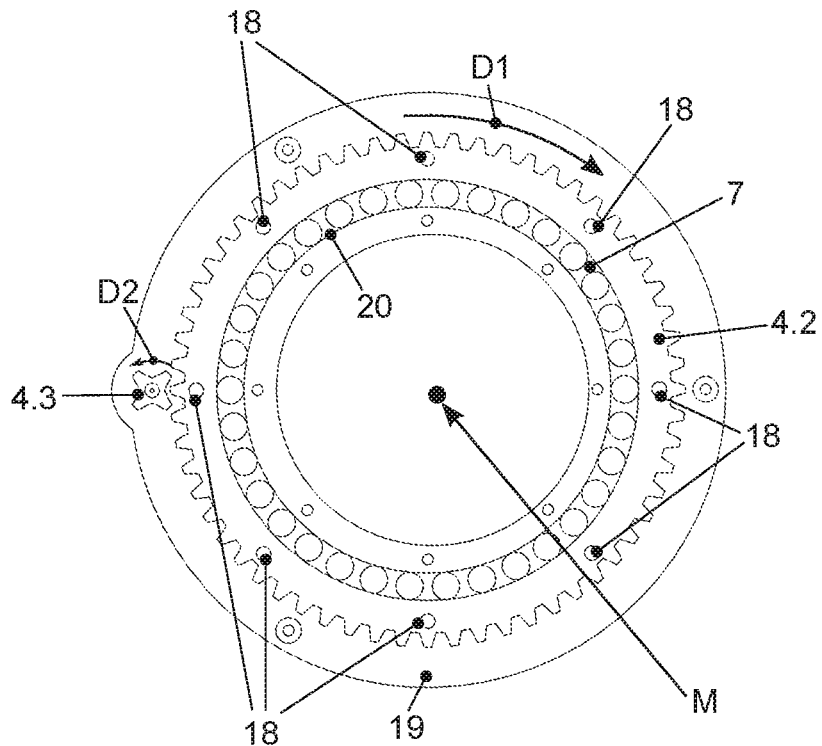
FIG. 3b shows an illustrative embodiment of a drive by drive means designed as belt pulleys with open belt guidance, and the arrangement of said drive means relative to one another.

An illustrative embodiment of an arrangement of the pinion 4.3 relative to the gearwheel 4.2 is shown in FIG. 3a. The pinion 4.3 with direction of rotation D2 engages in the gearwheel 4.2 and in this way transmits its torque to the gearwheel 4.2. As a result, the gearwheel 4.2 is rotated about the rotational axis A in direction of rotation D1. The gearwheel 4.2 is arranged in a radially symmetrical way around the central point M through which the rotational axis A passes. In particular, the rotational axis A is aligned perpendicularly to the gearwheel 4.2 itself. Moreover, the rotational axis A passes vertically through the supply container 2.

The gearwheel 4.2 and the pinion 4.3 are furthermore arranged under a cover 19. The cover 19 ensures that the drive means 4.2 and 4.3 are not visible from the outside and are furthermore protected from contamination, e.g. by dust. The gearwheel 4.2 is operated via a ball bearing 7 in order to minimize the friction during operation. On the inner wall 20 of the ball bearing there are screw fastening points 18a, by means of which a screwed joint with the lower end of the supply container 2 can be formed.

Figure 3B:
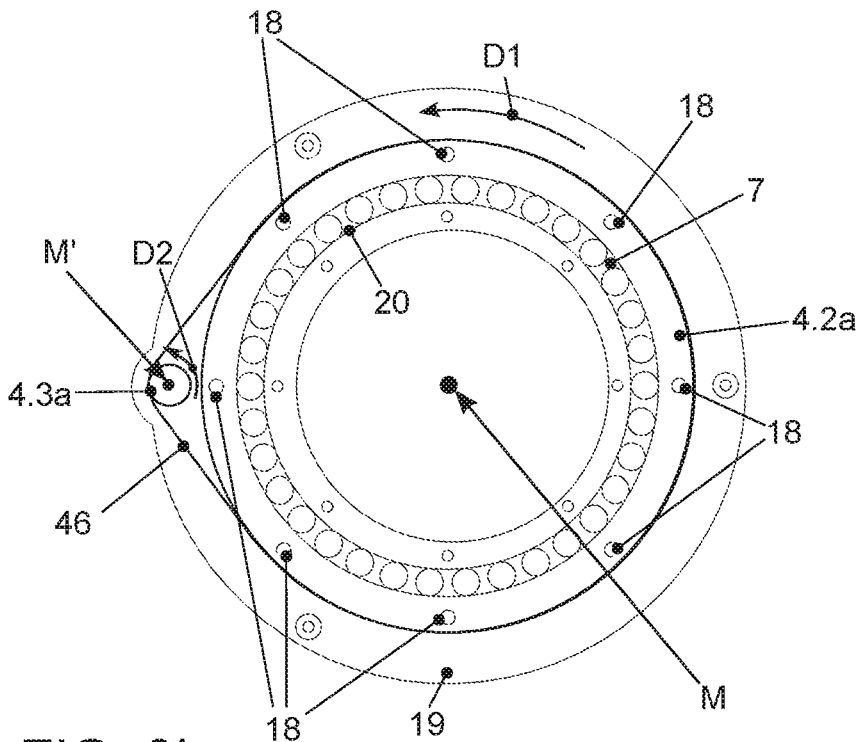

Another preferred illustrative embodiment of a drive of the distribution unit (3) by means of a belt drive is shown in FIG. 3b. The driving belt pulley 4.3a with direction of rotation D2 communicates via the drive belt 46 with the driven belt pulley 4.2a and in this way transmits its torque to the belt pulley 4.2a. As a result, the belt pulley 4.2a is rotated about the rotational axis A in direction of rotation D1. The belt pulley 4.2a is arranged in a radially symmetrical way about the central point M' through which the rotational axis A passes. In particular, the rotational axis A is aligned perpendicularly to the belt pulley 4.2a itself. Moreover, the rotational axis A passes vertically through the supply container 2.

The belt pulleys 4.2a and 4.3a and the drive belt 4.6 are furthermore arranged under a cover 19. The cover 19 ensures that the drive means 4.2a and 4.3a and the belt 46 are not visible from the outside and are furthermore protected from contamination, e.g. by dust. The belt pulley 4.2a is operated via a ball bearing 7 in order to minimize the friction during operation. On the inner wall 20 of the ball bearing there are screw fastening points 18a, by means of which a screwed joint with the lower end of the supply container 2 can be formed.

The connection of the distribution unit 3 to the gearwheel 4.2 or the belt pulley 4.2a is established via a screwed joint. In this case, the distribution unit 3 is screwed to the gearwheel 4.2 or the belt pulley 4.2a at points 18. As an alternative, the connection can also be established by means of a plug-in or adhesively bonded joint.

By virtue of the coupling of the distribution unit 3 to the gearwheel 4.2 or the belt pulley 4.2a, the torque of the pinion 4.3 is transmitted to the distribution unit 3 by means of the gearwheel 4.2 or the belt pulley 4.2a.

By virtue of the coupling of the distribution unit 3 to the gearwheel 4.2 or the belt pulley 4.2a and the screw fastening of the inner wall 20 of the ball bearing 7 to the supply container 2 and, where applicable, the design of the central axle 34 and of the rotary bearing 35 thereof, the distribution unit 3 can be rotated about the rotational axis A, like the gearwheel 4.2 or the belt pulley 4.2a. The gearwheel 4.2 or the belt pulley 4.2a furthermore has a central opening, thus allowing the particulate material 28 to fall through the gearwheel 4.2 or the belt pulley 4.2a into the distribution unit 3. Here, the radius of the gearwheel 4.2 or the belt pulley 4.2a is chosen so that the particulate material 28 can be supplied unhindered to the distribution unit 3. By virtue of the fact that the distribution unit 3 is connected directly to the gearwheel 4.2 or the belt pulley 4.2a, the distribution unit 3 furthermore assumes the direction of rotation D1 of the gearwheel 4.2 or the belt pulley 4.2a.

The speed of rotation of the distribution unit 3 is furthermore dependent on the speed of rotation of the gearwheel 4.2 or the belt pulley 4.2a. This, in turn, is dependent on the speed of rotation of the pinion 4.3 or the belt pulley 4.3a owing to the torque transmission by the pinion 4.3 or the belt pulley 4.3a. The speed of rotation furthermore determines the distance by which the particulate material 28 is ejected from the distribution unit 3 into the container of the reactor.

Figure 4A:
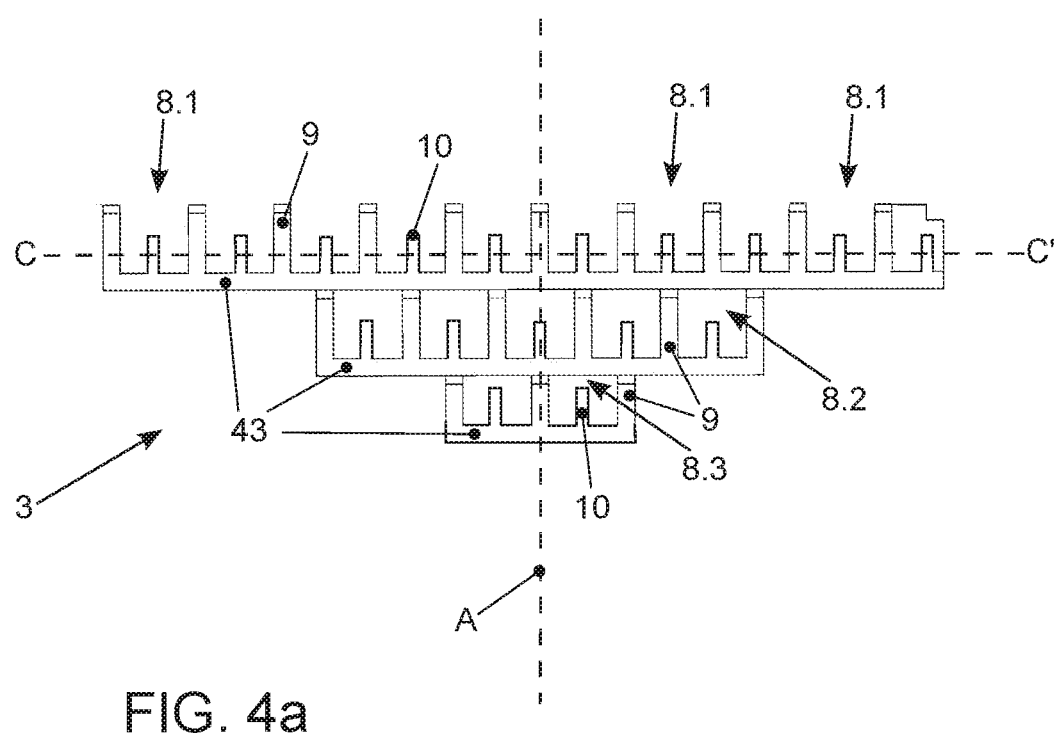
FIG. 4a shows an illustrative embodiment of a distribution unit of the filling device from FIG. 1 in a side view.
Figure 4B:
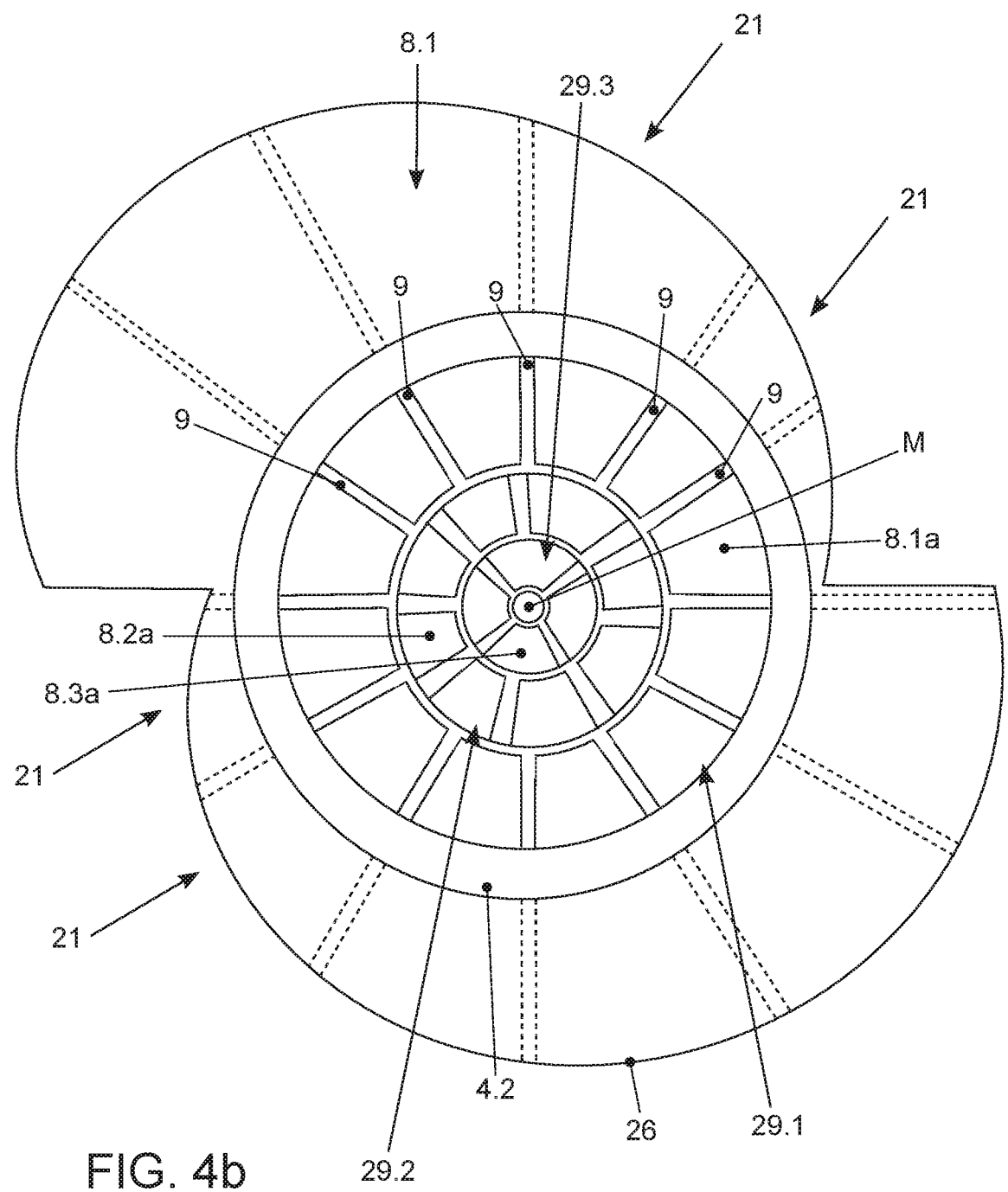
FIG. 4b shows an illustrative embodiment of a distribution unit of the filling device from FIG. 1 in a view from above.
Figure 4C:
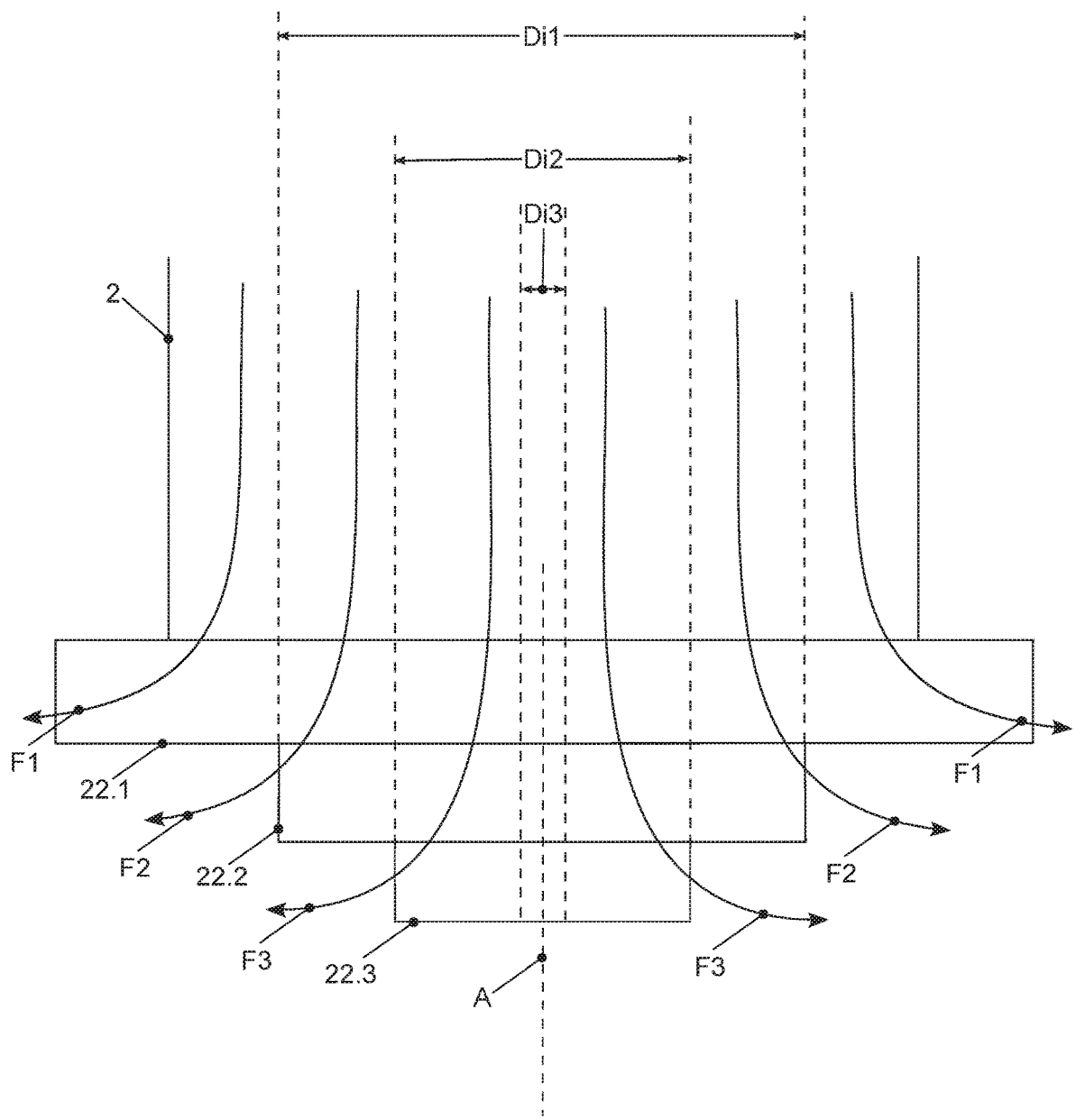
FIG. 4c shows another, highly schematized side view of the distribution unit, in which flows of the particulate material through the filling device are indicated.

A schematic structure of a first illustrative embodiment of the distribution unit 3 is shown with reference to FIGS. 4a, 4b and 4c. Here, a view of the distribution unit 3 from the side is shown in FIG. 4a, a view of the distribution unit 3 from above is shown in FIG. 4b and, once again, a schematic side view of the distribution unit 3 is shown in FIG. 4c.

The distribution unit 3 is divided into a plurality of sectors 8.1 to 8.3. In this case, sectors 8.1 are formed on the first module 22.1, sectors 8.2 are formed on the second module 22.2 and sectors 8.3 are formed on the third module 22.3. Here, sectors 8.1 to 8.3 are each separated from one another by separating elements 9. The separating elements 9 are designed, for example, as substantially vertical walls, which are each arranged between two adjacent sectors 8.1, 8.2 or 8.3.

Arranged in sectors 8.1, 8.2 and 8.3 there are in turn intermediate separating elements 10, which divide sectors 8 into subsectors (half-sectors). The intermediate separating elements 10 are likewise designed as substantially vertical partition walls, for example. The intermediate separating elements 10 are furthermore of lower and/or narrower design than the separating elements 9. For example, the intermediate separating elements 10 are designed to be only half as high and/or half as wide as the separating elements 9. Particularly by virtue of the different height of the intermediate separating elements 10 from that of the separating elements 9, it is possible for particulate material 28 to pass from one subsector to another subsector. On the other hand, it is not possible for particulate material 28 to be exchanged between sectors 8.1, 8.2 or 8.3. The division of sectors 8.1, 8.2 and 8.3 into subsectors ensures that the particulate material 28 is distributed more uniformly even in the distribution unit 3.

The fact that the distribution unit 3 has three annular concentric modules 22.1 to 22.3 has the result that an outlet openings 21 formed by the sectors 8.1 of the first 22.1, the sectors 8.2 of the second module 22.2 and the sectors 8.3 of the third annular module 22.3 are located in three different planes. The outlet openings 21 which are formed by the sectors 8.1 of the first annular module 22.1 are formed in an upper plane, the outlet openings 21 which are formed by the sectors 8.2 of the second annular module 22.2 are formed in a central plane and the outlet openings 21 which are formed by the sectors 8.3 of the third annular module 22.3 are formed in a lower plane.

Further means for distributing the particulate material 28 can be arranged at the outlet openings 21 on each of the modules 22.1 to 22.3. These means for distribution can be of brush-type design, for example, deflecting the particulate material 28 in different directions. The brushes, in turn, have bristles, which are manufactured from a soft and flexible plastic material, for example. The brushes can furthermore have different shapes. Such brushes are described in WO 2005/051814 A1, for example, which is incorporated by reference into the present application. Here, the bristles can be secured only on the outer edge of the respective base plates 43; as an alternative or in addition, however, they can also be secured on the outer end of individual separating elements 9 or of all the separating elements 9 or on the outer end of individual intermediate elements 10 or of all the intermediate elements 10 and can each point substantially radially outward. Here, the bristles can be attached individually or in bunches, e.g. being secured, e.g. adhesively bonded, in corresponding holes.

As shown in FIG. 4b, the sectors 8.1 to 8.3 of each annular module 22.1 to 22.3 have sector openings 8.1a, 8.2a and 8.3a, which are open in the direction of the supply container 2 situated thereabove.

FIG. 4c shows another side view of the distribution unit 3. Here, the different sizes of the inside diameters Di1 to Di3 of the annular modules 22.1 to 22.3 are visible by virtue of the concentric arrangement of the annular modules 22.1 to 22.3. Here, the outside diameter of the annular module 22.1 in the upper plane is not constant around the central point M of the distribution unit 3. In the lower half shown in FIG. 3b, the outer radius of the annular module 22.1 increases from left to right and, in the upper half of the annular section 22.1, it increases from right to left. This results in the overall shape, shown in FIG. 4b, of the upper annular section 22.1.

Moreover, as shown in FIG. 4b, the upper annular module 22.1 is partially covered by a cover 26. Here, the separating elements 9 of the part of the upper annular module 22.1 which is covered by the cover 26 are indicated by dashed lines.

The gearwheel 4.2 is connected to the cover 26, for example. Moreover, the cover 26 prevents particulate material 28 from being able to emerge upward from the distribution unit 3 in an uncontrolled manner. The cover 26 furthermore closes off the distribution unit 3 at the top. Moreover, contaminants and dirt are prevented from entering the distribution unit.

By virtue of the upwardly open sector openings 8.1a to 8.3a, the annular modules 22.1 to 22.3 have upwardly open sections 29.1 to 29.3. Here, the supply container 2 is arranged directly above these sections 29.1 to 29.3. As a result, particulate material 28 is supplied to the distribution unit 3.

As already explained, rotation of the gearwheel 4.2 then leads to rotation of the distribution unit 3. This, in turn, leads to the particulate material 28 which is supplied to the distribution unit 3 from the supply container 2 being exposed to a centrifugal force. As a result, the particulate material 28 is ejected from the distribution unit 3 into the container of the reactor.

Here, the distance by which the particulate material 28 is ejected into the container of the reactor is dependent on the speed of the particulate material 28 at the time it emerges from the outlet openings 21 of the various annular sections 22.1 to 22.3 of the distribution unit 3.

The flow of the particulate material 28 through the distribution unit is explained with reference to FIG. 4c.

Here, the inside diameter Di1 of the uppermost annular module 22.1 is larger than the inside diameter Di2 of the central annular module 22.2, which, in turn, is larger than the inside diameter Di3 of the lowermost annular module 22.3. An inside diameter relationship of: Di1>Di2>Di3 is therefore obtained.

The flow control means 5 and the supply container 2 are arranged above the uppermost annular module 22.1. In order to provide filling of all the annular modules 22.1 to 22.3, the inside diameter of the supply container 2 must be larger than the inside diameter Di1 of the uppermost annular module 22.1.

Particulate material 28 which enters the supply container 2 in the area between the wall of the supply container 2 and the inside diameter Di1 therefore falls into the uppermost annular module 22.1. Here, the flow of the particulate material 28 follows the arrows F1 in schematic form. Particulate material 28 which enters the supply container 2 in the area between the inside diameter Di1 and Di2 falls into the central annular module 22.2. Here, the flow of the particulate material 28 which falls into the central annular module 22.2 is indicated by the arrows F2. Particulate material 28 which enters the supply container 2 in the area between the inside diameter Di2 and Di3 falls into the lowermost annular module 22.3. Here, the flow of the particulate material 28 which falls into the lowermost annular module 22.3 is indicated by the arrows F3.

Moreover, the annular modules 22.1 to 22.3 have different outside diameters. This results in different ejection distances of the particulate material 28 which is ejected from the different levels.

In one embodiment, at least the upper annular module 22.1 has the shape described with reference to FIG. 4b. By virtue of the change in the outer radius of the upper annular section 22.1, particles in the various sectors 8 of the upper annular section 22.1 have different radial velocities at the respective outlet openings 21. As a result, the ejection distance of the particulate material 28 which is ejected into the container from the upper annular module 22.1 also differs. In addition, the second 22.2 and the third annular module 22.3 can have an overall shape explained with reference to FIG. 4b.

As an alternative or in addition, the speed of rotation of the distribution unit 3 can also be varied. By means of the speed of rotation, the ejection distance of the particulate material 28 can be controlled. The faster the distribution unit 3 rotates, the higher is the radial velocity of the particulate material 28 at the respective outlet openings 21 of the different annular modules 22.1 to 22.3.

As an alternative or in addition, the distribution unit 3 can also be moved in translation in the container. For example, the entire filling device 1 can be pivoted backward and forward in the container of the reactor. This results in particularly uniform distribution of the particulate material in the container.

Another illustrative embodiment of the annular modules 22.1 to 22.3 of the distribution unit 3 is explained with reference to FIGS. 9a to 9d.

Figure 9A:
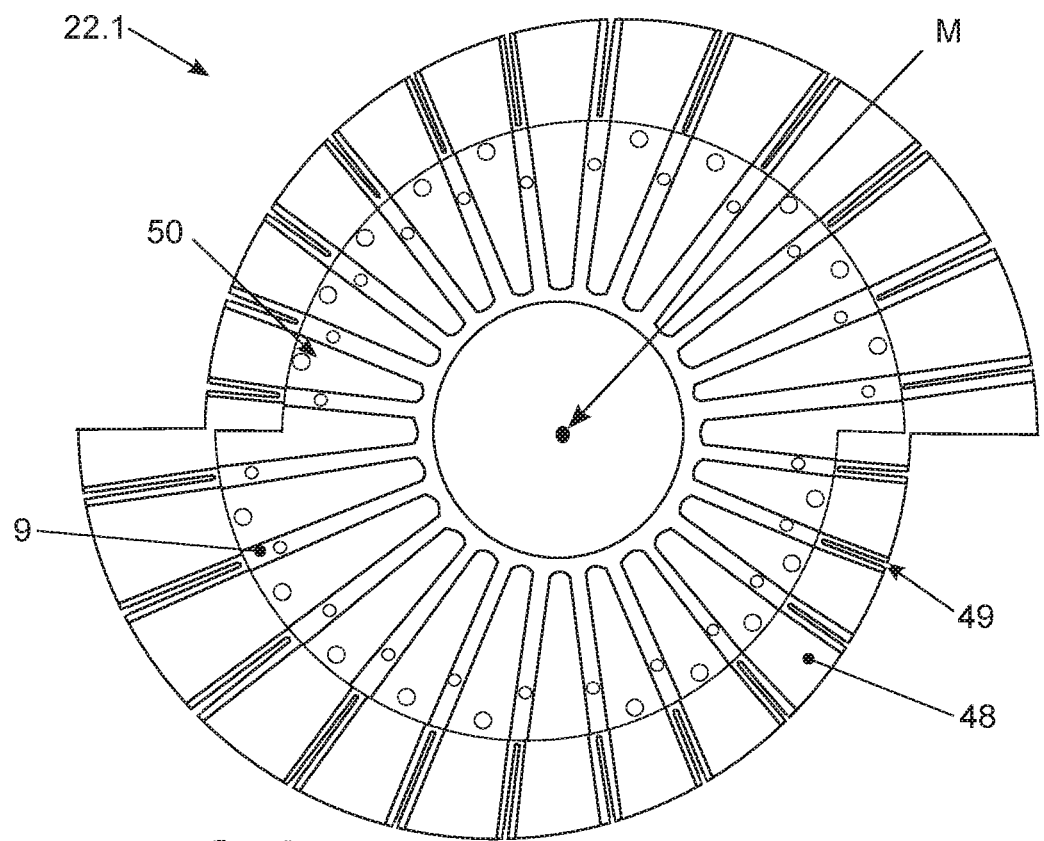

Annular module 22.1, which forms the uppermost module in the filling device 1, is shown by way of example in FIG. 9a. Here, module 22.1 has an inflexible section 50, which corresponds substantially to the first module 22.1 from the first illustrative embodiment. In particular, the inflexible section 50 is designed as a base plate 43 of annular module 22.1.

At its outlet opening 21, each sector 8 of annular module 22.1 has a flexible, radially outward-oriented extension. Here, the flexible extensions are divided into first flexible extensions 48 and second flexible extensions 51. In this case, the extensions are flexible, in particular, in directions which lead out of the plane defined by the base plate 43 of annular module 22.1. In particular, therefore, the extensions are designed to bend upward in the direction in which the supply container 2 is arranged and downward, counter to the direction in which the supply container 2 is arranged.

Here, the first flexible extensions 48 extend horizontally in the plane defined by the base plate 43 of annular module 22.1 and are secured on the outer edge of the base plate 43. The first flexible extensions 48 thereby form a flexible outer ring around annular module 22.1. The flexible outer ring is of multi-piece design. Between each two adjacent first extensions 48 there is a slot 49. This gives rise to a tab-type design of the first extensions 48. Here, the first extensions 48 are manufactured from a flexible material. In particular, the material is rubber or a rubber-elastic plastic, and therefore the first flexible extensions 48 are designed as rubber tabs.

Here, the outside diameter of annular module 22.1 is once again not constant around the central point M of the distribution unit 3. In the illustrative embodiment in FIG. 9a, however, this is achieved by virtue of the fact that the length of the flexible extensions 48 increases and decreases from segment to segment in the lower half and the upper half respectively. This results in the overall shape of annular module 22.1 shown in FIG. 9a. Here, this overall shape ensures uniform filling of a container, in particular of a reactor, with particulate material 28.

Figure 9B:
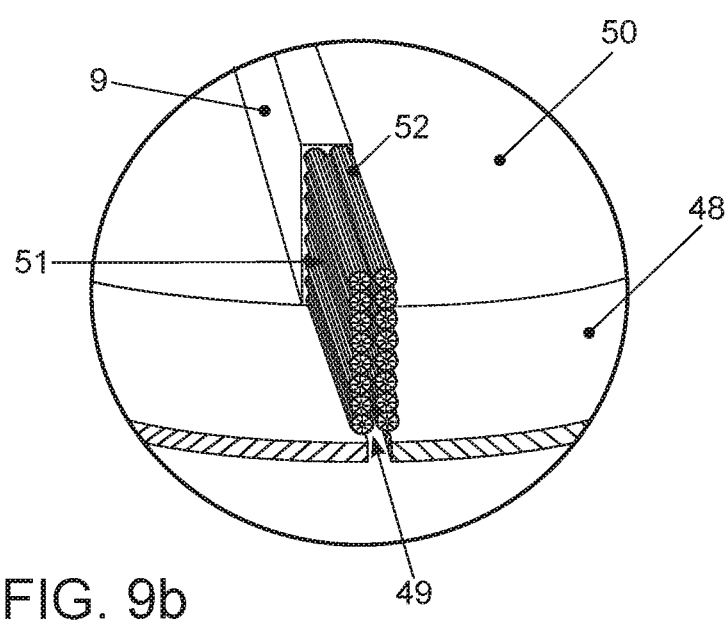

The second flexible extensions 51 are shown in FIG. 9b. The second flexible extensions 51 extend perpendicularly to the plane defined by the base plate 43 of annular module 22.1. In particular, the second flexible extensions 51 are of brush-type design. Here, a plurality of bristles are grouped into a bristle bunch 52. A plurality of bristle bunches 52 can then be arranged one above the other and one next to the other, giving rise to a plurality of vertically extending rows of bristle bunches 52. The bristle bunches 52 are secured, e.g. adhesively bonded, in corresponding holes on the outer end of individual separating elements 9 or of all the separating elements 9 and/or on the outer end of individual intermediate separating elements 10 or of all the intermediate separating elements 10. Here, the holes for the bristle bunches can have a diameter in a range of from 3 mm to 6 mm and a depth in a range of from 6 mm to 12 mm, for example. As an alternative to bunch-wise arrangement, the bristles can also be attached individually. Here, the brushes 51 are, in particular, arranged above the slots 49 between the first flexible extensions 48. The brushes form an extension of the separating elements 9 and/or of the intermediate separating elements 10 on which they are arranged and thus extend the walls of the sectors 8.

The bristles of the brushes 51 are manufactured from a soft and flexible plastic material, for example. The brushes 51 can furthermore have different shapes. The brushes can correspond to those in the first illustrative embodiment of the distribution unit 3.

The length of the bristles is freely selectable and they can be longer or shorter than the extensions 48 situated thereunder. Preferably, however, they are selected so that the bristle bunches 52 coincide with the outer radius defined by the length of the rubber-elastic extensions 48 situated thereunder.

Figure 9C:
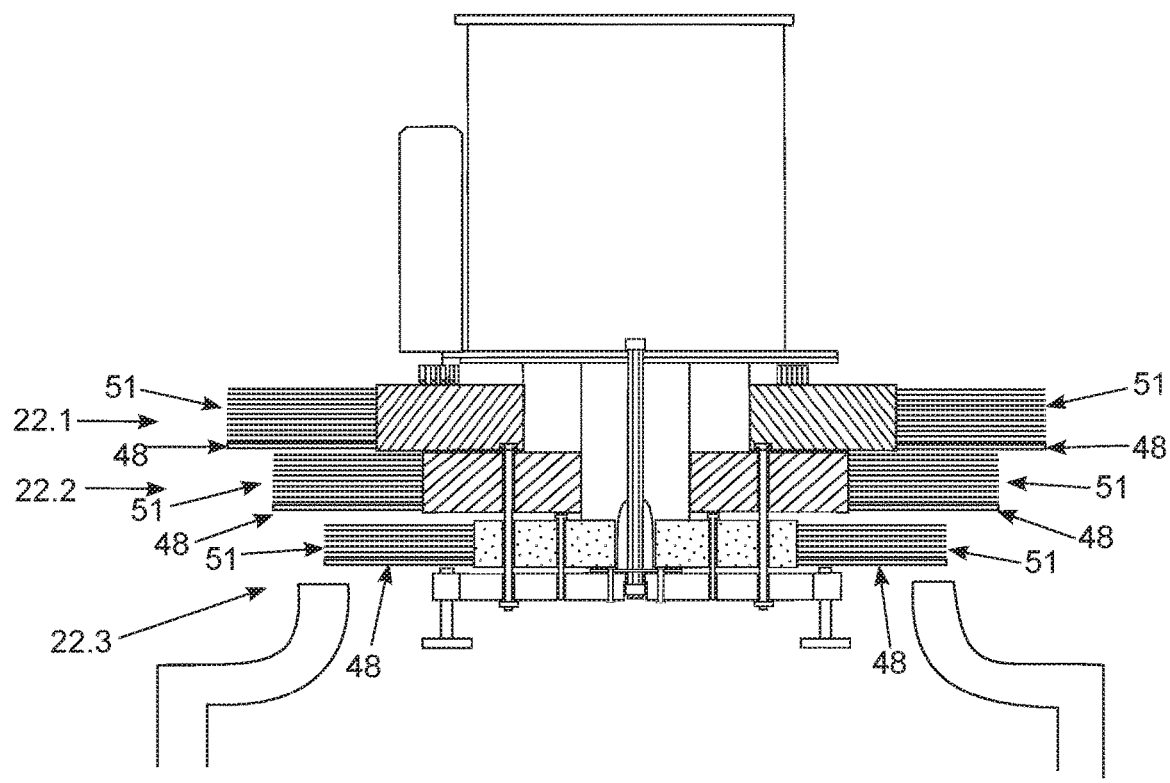
Figure 9D:
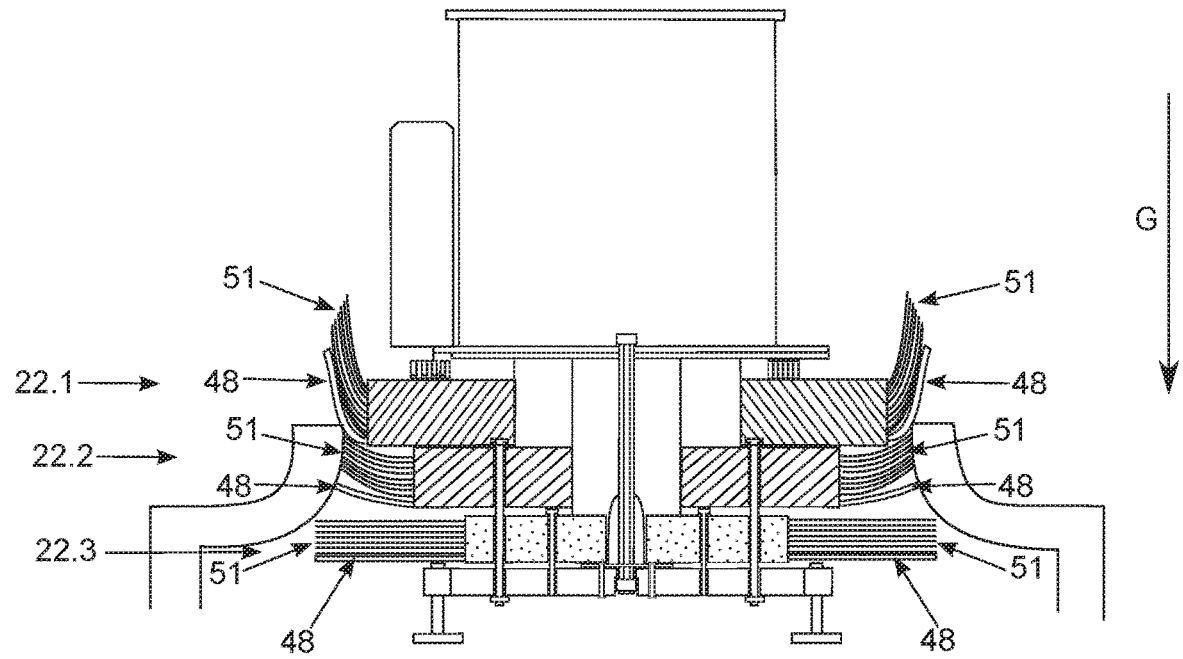

The flexibility of module 22.1 from FIGS. 9a and 9b is explained with reference to FIGS. 9c and 9d.

The possible diameter of the filling device 1 according to the invention is limited by the introduction opening, indicated schematically in the figure, for the reactor to be filled. In order to be able to ensure improved filling of such a reactor with particulate material 28, the diameter of the annular modules 22.1 to 22.3, especially of module 22.1, should be as large as possible, however.

The fact that the annular modules 22.1 to 22.3 have the flexible extensions 48 and 51 makes it possible to ensure a large diameter of the filling device 1, which can nevertheless be introduced into a reactor with a small opening. In the example shown, the diameter of the reactor opening is smaller than the diameter of each of the annular modules 22.1 to 22.3.

If the filling device 1 is introduced into the reactor in the direction G, the flexible extensions 48 and 51 of the lowermost annular module 22.3 strike the walls of the opening of the reactor first. By virtue of the fact that the extensions are flexible, they are deformed in such a way that they bend upward counter to the direction of motion G of the filling device 1. Once annular module 22.3 has been introduced into the reactor to such an extent that it no longer touches the walls of the reactor opening, the flexible extensions 48 and 51 move back into their initial position before introduction into the reactor. The flexible extensions 48 and 51 of annular modules 22.1 and 22.2 behave in a similar manner to the flexible extensions 48 and 51 of annular module 22.3.

If the filling device 1 is moved out of the reactor again, i.e. counter to direction of motion G, the flexible extensions 48 and 51 bend downward.

Figure 5A:
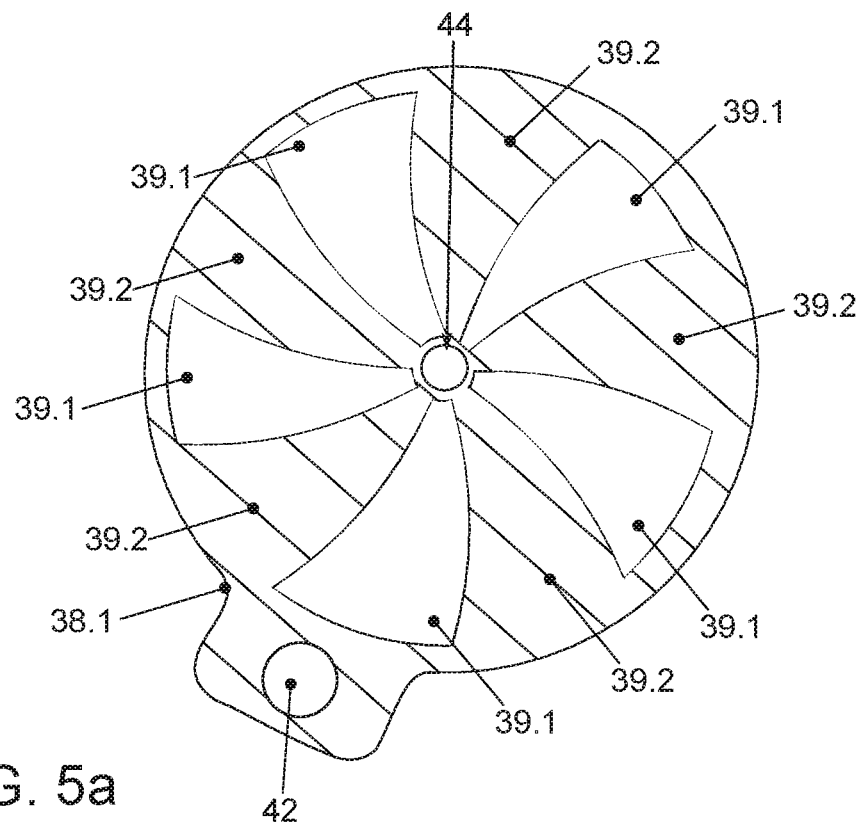
FIGS. 5a to 5c show a first illustrative embodiment of a flow control means of the filling device.
Figure 5B:
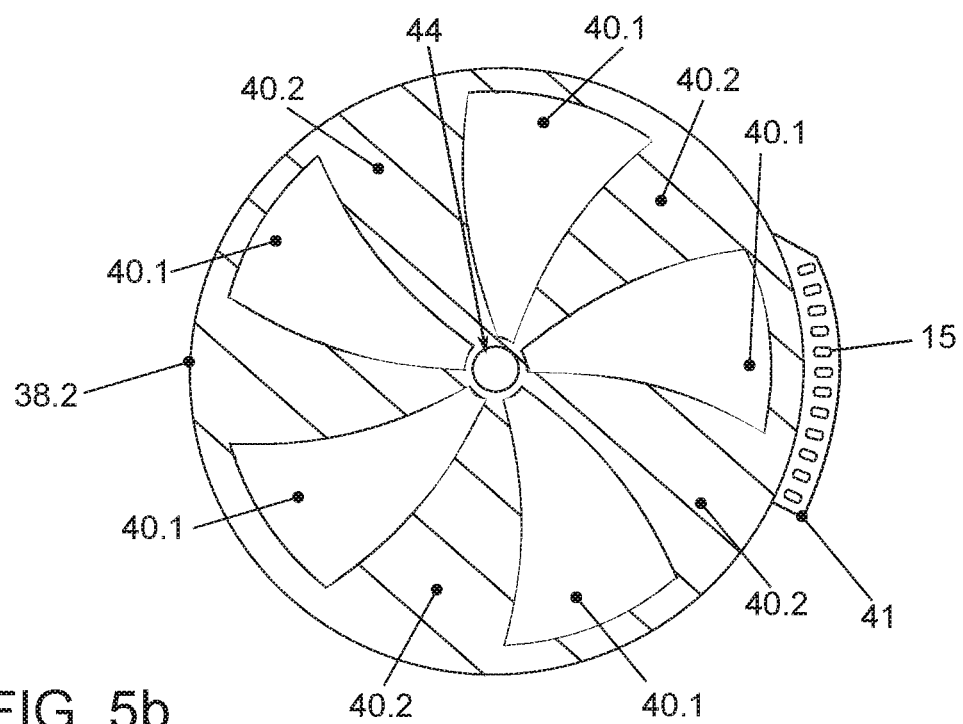

A first illustrative embodiment of the flow control means 5 arranged between the supply container 2 and the distribution unit 3 is explained with reference to FIGS. 5a to 5c.

The flow control means 5 comprises a first, fixed disk 38.1 and a second, movable, in particular rotatable, disk 38.2. Disk 38.1 is shown in FIG. 5a. Disk 38.1 is arranged at the lower opening 2.2 of the supply container 2. Disk 38.1 therefore forms the base of the supply container 2 and closes off the supply container 2 at the bottom.

Openings 39.1 and webs 39.2 are formed in disk 38.1. The particulate material 28 enters the container through the openings 39.1. Here, the openings 39.1 are designed in such a way that a plurality of sectors 8 of the annular modules 22.1 to 22.3 can be filled through them. Furthermore, disk 38.1 has a hole 44, through which the optionally present axle 34 passes, as already explained with reference to FIG. 2a.

For selective control of the flow of particulate material 28 through the flow control means 5, the second disk 38.2 is arranged below the first disk 38.1. Here, the second disk 38.2 is of complementary design to the first disk 38.1. However, like disk 38.1, the second disk has the hole 44, through which the optionally present axle 34 can pass. Here, the holes 44 in disk 38.1 and the second disk 38.2 are arranged directly one above the other.

In one setting, the second disk 38.2 is arranged below the first disk 38.1 in such a way that the openings 39.1 and 40.1 are directly one above the other. Passages 16 are thereby formed, through which the particulate material 28 can flow into the container. Here, the size of the passages 16 can be varied by way of the position of the two disks 38.1 and 38.2 relative to one another. If the additional disk 38.2 is rotated relative to disk 38.1, the webs 40.2 of the additional disk 38.2 move below the openings 39.1 in the first disk 38.1. The passages 16 are thereby reduced in size.

In order to rotate the second disk 38.2 relative to the first disk 38.1, the additional disk 38.2 has a section 41, in which notches 15 are formed.

Protrusions (in particular teeth) 23 of an actuating wheel 12.2, which is part of an actuating device 12, engage in the notches 15.

The actuating wheel 12.2 is coupled to a servomotor 12.1 by a shaft 12.3. The servomotor 12.1 is driven by means of a pushbutton 12.4, which can be operated by a user.

If the servomotor 12.1 is driven, a rotation is transmitted to the shaft 12.3, on which the actuating wheel 12.2 is secured. The actuating wheel is thereby rotated.

As a result, the second disk 38.2 can be rotated until the webs 40.2 are arranged fully beneath the openings 39.1 in the first disk 38.1. The passages 16 are then closed, with the result that no more particulate material 28 can flow into the container.

As an alternative, the second disk 38.2 can also be arranged above disk 38.1. By way of example, disk 38.1 can also be composed of a first part, which has only the webs 39.2, and a second part, which has only an outer ring, on which the first part is secured. The openings 39.1 are then obtained by means of the webs 39.1 in combination with the outer ring.

A second illustrative embodiment of the flow control means 5 arranged between the supply container 2 and the distribution unit 3 is explained with reference to FIGS. 6a to 6d.

Figure 6A:
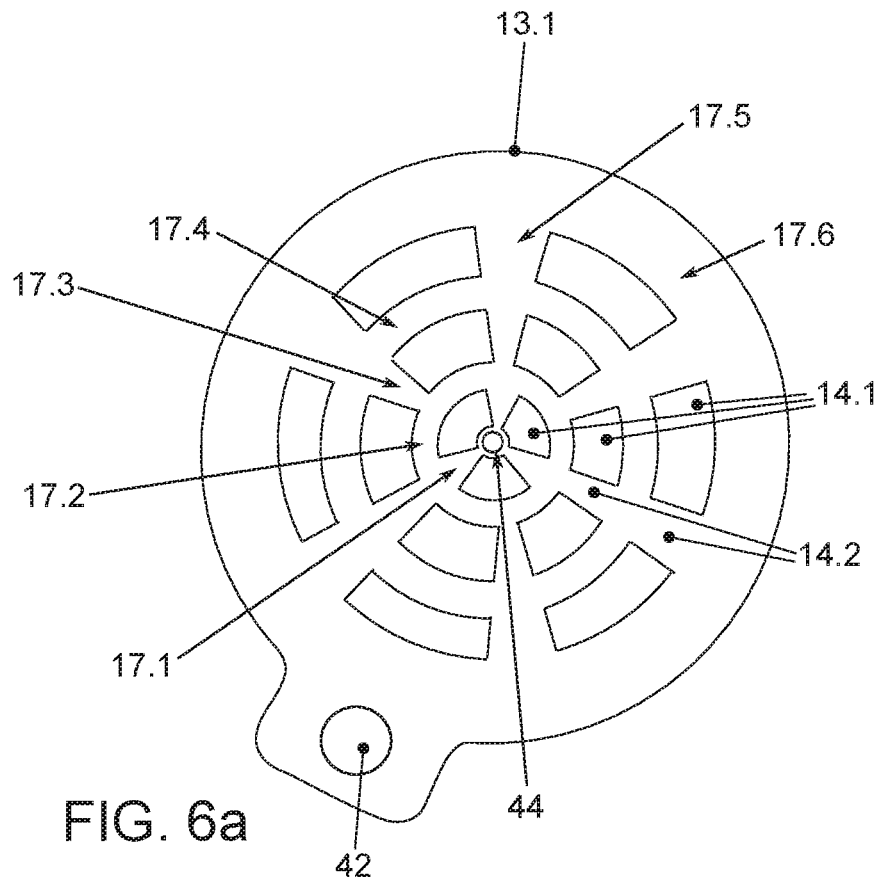
FIGS. 6a to 6d show a second illustrative embodiment of a flow control means of the filling device.

Here, the flow control means 5 comprises a disk 13.1, as shown in FIG. 6a. Disk 13.1 is designed as a circular disk. Disk 13.1 is arranged at the lower opening 2.2 of the supply container 2. Disk 13.1 therefore forms the base of the supply container 2 and closes off the supply container 2 at the bottom. Like disks 38.1 and 38.2, disk 13.1 has the hole 44, through which the optionally present axle 34 can pass.

Disk 13.1 has six ring sections 17.1 to 17.6. In the first 17.1, third 17.3 and fifth ring sections 17.5, the first disk 13.1 has openings 14.1. The openings 14.1 are configured as ring sectors. Moreover, the size of the openings 14.1 is such that a plurality of sectors of the annular modules 22.1 to 22.3 of the distribution unit 3 can be filled through each opening 14.1. In particular, the circular disk 13.1 is arranged in such a way that the openings 14.1 thereof are situated directly above the sectors 8 of the distribution unit 3.

The other ring sections 17.2, 17.4 and 17.6 do not have any openings and are connected to one another by means of the webs 14.2 arranged in the first 17.1, third 17.3 and fifth 17.5 ring sections, adjacent to the openings 14.1.

Figure 6B:
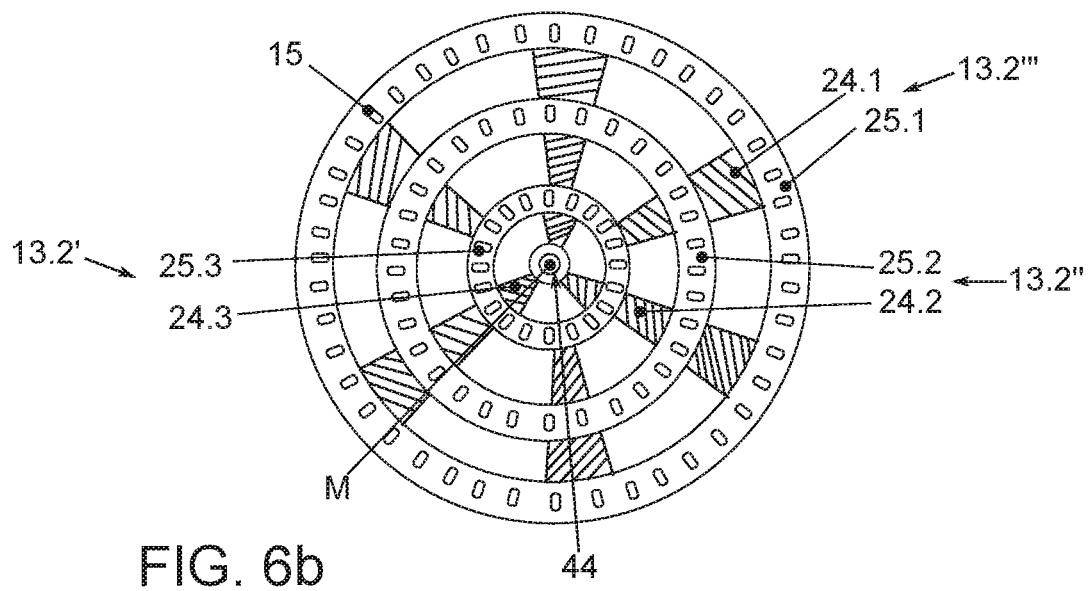

The flow control means 5 furthermore comprises three opening control means 13.2' to 13.2''', as shown in FIG. 6b. Each of the opening control means 13.2' to 13.2''' has at least one ring section 25.1 to 25.3 and shutters 24.1 to 24.3. The ring sections 25.1 to 25.3 are designed in such a way that they form concentric rings arranged around a central point M. In this case, the ring section 25.1 of opening control means 13.2''' forms an outer ring, the ring section 25.2 of opening control means 13.2'' forms a central ring, and the ring section 25.3 of opening control means 13.2' forms an inner ring. Moreover, the opening control means 13.2' to 13.2''' likewise have at the central point M thereof the hole 44, thus enabling the optionally present axle 34 to pass through. Here, the holes 44 of the opening control means 13.2' to 13.2''' and of disk 13.1 are arranged one above the other.

In the example in FIG. 6b, all shutters 24.1 are arranged one below the other. Shutters 24.2 and shutters 24.3 are likewise arranged one below the other. During assembly with disk 13.1, the shutters 24.1 to 24.3 would be arranged below the associated webs and would thus form a completely open flow control means 5, as shown in side view in FIG. 6*d*.

Ring section 25.3 is connected to shutters 24.3. Ring section 25.2 is connected to shutters 24.2, and ring section 25.1 is connected to shutters 24.1.

The shutters 24.1 of the outer opening control means 13.2''' are designed in such a way that they can each completely or partially cover a sector opening 8.1*a* of sectors 8.1 of annular module 22.1 of the distribution unit 3. Moreover, the outer opening control means 13.2''' has the same number of shutters 24.1 as annular module 22.1 has sector openings 8.1*a*. As a result, each sector opening 8.1*a* of annular section 22.1 can once again be completely or partially covered on an individual basis.

The shutters 24.2 of the central opening control means 13.2'' are designed in such a way that they can each completely or partially cover a sector opening 8.2*a* of annular module 22.2 of the distribution unit 3. Moreover, the central opening control means 13.2'' has the same number of shutters 24.2 as annular module 22.2 has sector openings 8.2*a*. As a result, each sector opening 8.2*a* of annular section 22.2 can be completely or partially covered on an individual basis.

The shutters 24.3 of the inner opening control means 13.2' are designed in such a way that they can each completely or partially cover a sector opening 8.3*a* of annular module 22.3 of the distribution unit 3. Moreover, the inner opening control means 13.2' has the same number of shutters 24.3 as annular module 22.3 has sector openings 8.3*a*. As a result, each sector opening 8.3*a* of annular section 22.3 can be completely or partially covered on an individual basis.

Figure 6C:
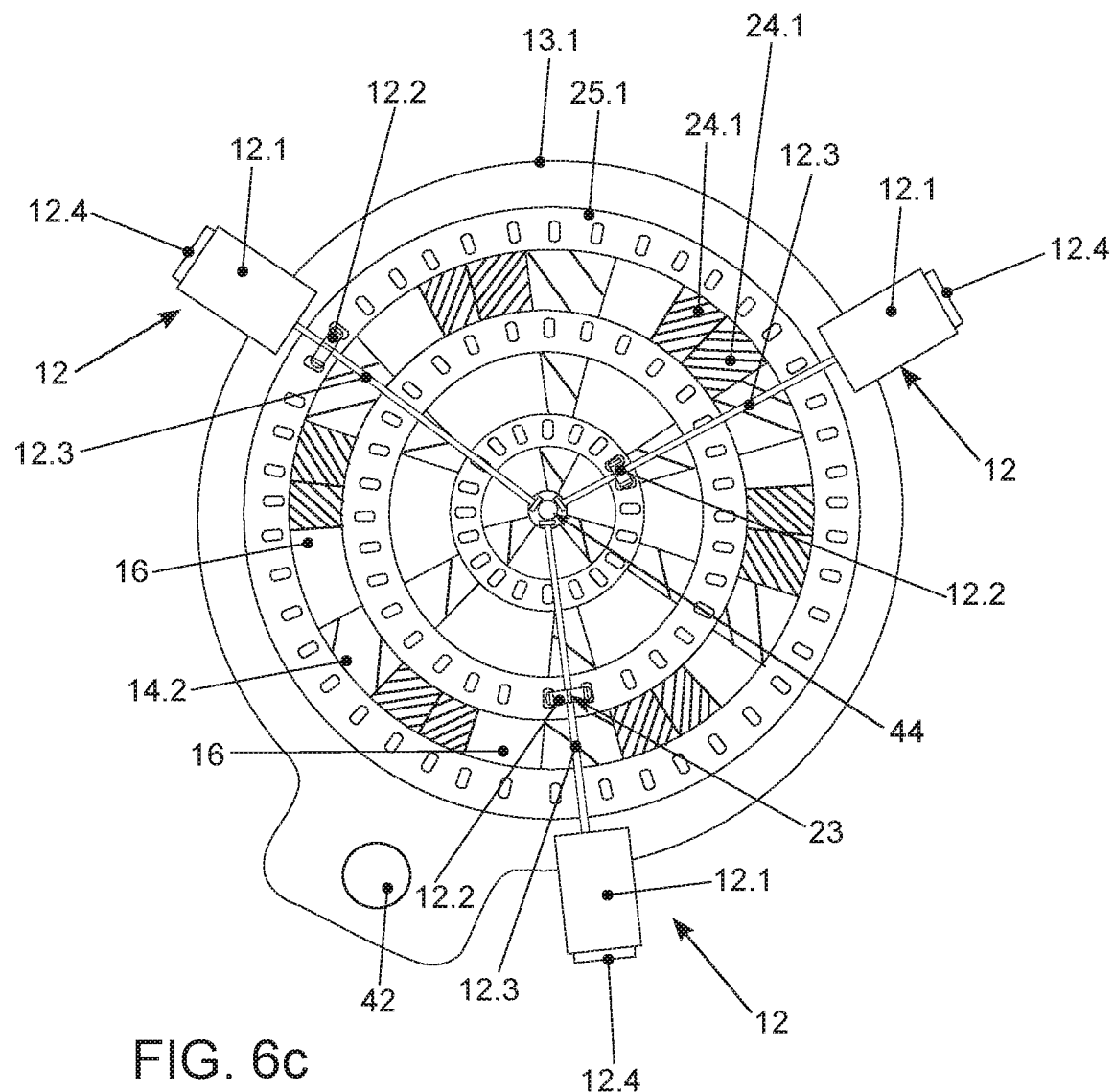
Figure 6D:
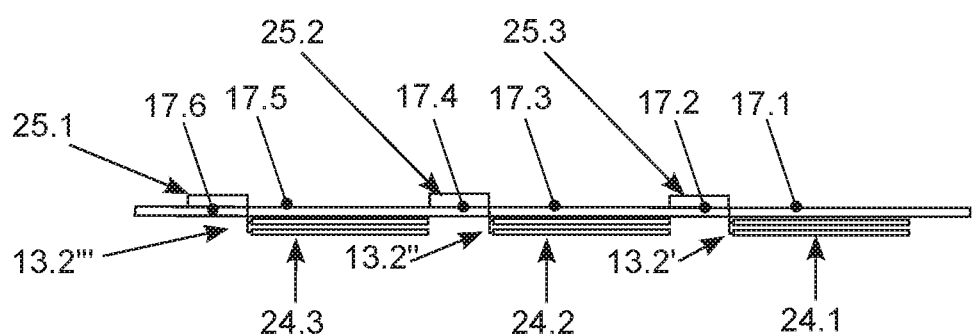

In this regard, a side view of the flow control means 5 is shown in FIG. 6*d*. In the example in FIG. 6*d*, the openings 14.3 are completely open. Here, the shutters 24.1 of the outer opening control means 13.2''' are arranged below the webs 14.2 of the fifth ring section 17.5 of disk 13.1. The ring section 25.1 of the outer opening control means 13.2''' is furthermore arranged in ring section 17.6 of disk 13.1.

The shutters 24.2 of the central opening control means 13.2'' are arranged below the webs 14.2 of the third ring section 17.3 of disk 13.1. The ring section 25.2 of the central opening control means 13.2'' is furthermore arranged in ring section 17.4 of disk 13.1.

The shutters 24.3 of the inner opening control means 13.2' are arranged below the webs 14.2 of the first ring section 17.1 of disk 13.1. The ring section 25.3 of the central opening control means 13.2' is furthermore arranged in ring section 17.2 of disk 13.1.

The ring sections 25.1 to 25.3 of opening control means 13.2' to 13.2''' are supported rotatably on the respective ring section 17.2, 17.4 or 17.6 of disk 13.1. Moreover, the shutters 24.1 to 24.3 are connected to the respectively associated ring section 25.1 to 25.3. This has the effect that, when one section 25.1 to 25.3 is rotated, the position of the shutters 24.1 to 24.3 connected to the respective ring section 25.1 to 25.3 relative to the openings 14.1 of disk 13.1 can be changed.

A fully assembled flow control means 5 is shown schematically in FIG. 6*c*.

In order to rotate the ring sections 25.1 to 25.3 of the opening control means 13.2' to 13.2''', the flow control means 5 has an actuating device 12 for each opening control means 13.2' to 13.2'''. In the present example in FIG. 6*c*, therefore, the flow control means 5 has a total of three actuating devices 12.

Figure 5C:
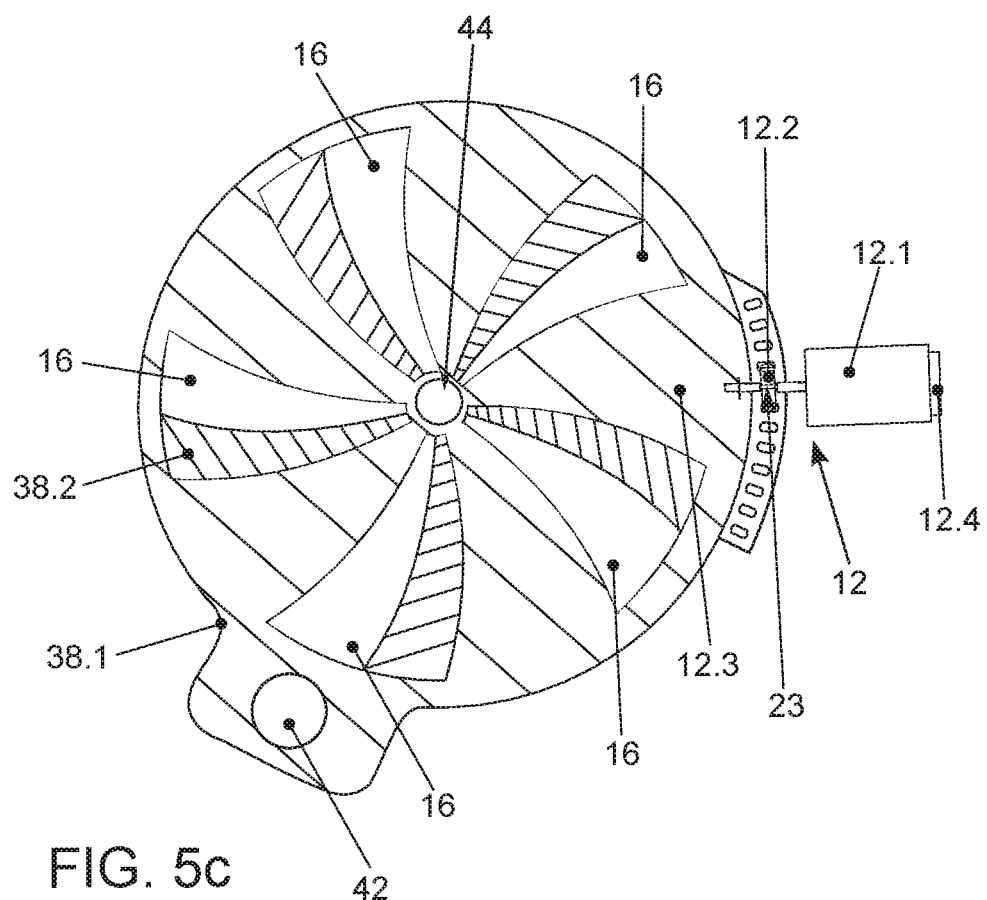

Here, each of the three actuating devices 12 is designed like the actuating device from the first illustrative embodiment in FIG. 5*c*. Each actuating device 12 therefore comprises a servomotor 12.1, a rotatable actuating wheel 12.2 and a shaft 12.3, by which the servomotor 12.1 is coupled to the actuating wheel 12.2. The servomotor 12.1 can be driven by means of a pushbutton 12.4, which can be operated by a user.

Here, the servomotor 12.1 first of all transmits a rotation to the shaft 12.3, on which the actuating wheel 12.2 is secured. The actuating wheel 12.2 is thereby rotated.

The actuating wheel 12.2, in turn, has protrusions 23. The protrusions 23 engage in the notches 15 in the ring sections 25.1 to 25.3. Here, the mutual spacing of the protrusions 23 is chosen so that it corresponds to the spacing of the notches 15. In this case, the spacing of the notches 15 in each ring section 25.1 to 25.3 can be chosen to be different.

If the actuating wheel 13.2 is rotated, annular section 25.1 is moved and thereby rotated by the protrusions 23 which engage in the notches 15. The next protrusion 23 then engages in turn in the next notch 15.

If the pushbutton 12.4 is released, the rotation of the servomotor 12.1 is also stopped. The rotation of ring section 25.1 is thereby stopped.

By virtue of the fact that ring section 25.1 is connected to shutters 24.1, ring section 25.2 is connected to shutters 24.2 and ring section 25.3 is connected to shutters 24.3, shutters 24.1 to 24.3 are moved when an associated ring section 25.1 to 25.3 is rotated. As a result, the positions of the shutters relative to the openings 14.1 of disk 13.1 are changed.

This is explained with reference to the outer opening control means 13.2'''. For example, one of the shutters 24.1 is pulled in each case fully from below the web 14.2 of the sixth ring section 17.6 of disk 13.1 for each rotation of the actuating wheel 12.2. As a result, one entire sector opening 8.1*a* of annular module 22.1 of the distribution unit 3 is covered by a shutter 24.1 for each rotation. No particulate material 28 can then enter the covered sector 8.1. In the example under consideration, one shutter 24.1 is furthermore moved out from below each of the webs 17.2 of the sixth ring section 17.6 of disk 13.1 for each rotation of the actuating wheel.

As a result, each opening 14.1 of the fifth ring section 17.5 of disk 13.1 is covered by precisely one shutter 24.1. Since, however, one shutter 24.1 has only the size of one sector opening 8.1*a* of annular module 22.1, the opening 14.1 is not completely covered, only its size being reduced. As a result, passages 16 are formed, the sizes of which are smaller than the passages of the openings 14.1. Here, the sizes of the passages 16 can be adjusted by means of the number of shutters 24.1 which are pulled out from under the webs 14.2. In this case, the size of a passage 16 corresponds to the size of the opening 14.1 of disk 13.1 when none of the shutters 24.1 has been pulled out from under the webs 14.2 of disk 13.1.

By a further rotation of the actuating wheel 12.2, an additional shutter 24.1 is pulled out from under the webs 14.2 of the fifth ring section 17.5 of disk 13.1. It is thereby possible to adjust the size of the passages 16 through which the particulate material 28 is ultimately supplied to the distribution unit 3 by means of the number of rotations of the actuating wheel 12.2.

The passages 16 for the central 13.2'' and the inner 13.2' opening control means are adjusted in the same way as the passages 16 of the outer opening control means 13.2'''.

The first and the second illustrative embodiment of the flow control means 5 can be combined with one another, for example. In particular, the additional disk 38.2 can have shutters, which are secured on the webs 40.2. The openings 39.1 of disk 38.1 can thereby be covered by a combination of webs and shutters.

As an alternative, the opening control means 13.2' to 13.2''' can also be arranged above disk 13.1.

As an alternative, the first illustrative embodiment too can comprise shutters which are arranged below or above the webs 39.1 of disk 38.1 instead of the additional disk 38.2. For example, three shutters can be arranged below each web of disk 38.1, wherein three shutters together have the size of one opening 39.1. For each step of rotation with the actuating device 12, one shutter is then pulled out from below or above the webs 39.1.

Furthermore, the second illustrative embodiment can have an additional disk of complementary design to disk 13.1 instead of the shutters 24.1 to 24.3.

A third illustrative embodiment of the flow control means 5 arranged between the supply container 2 and the distribution unit 3 is explained with reference to FIGS. 6a, 7a and 7b.

The flow control means 5 comprises a first disk 13.1 of the kind already explained with reference to FIG. 6a. The disk 13.1 has six ring sections. The first disk 13.1 has openings configured as ring sectors in the first (innermost), third (central) and fifth (outermost) ring section.

Figure 7A:
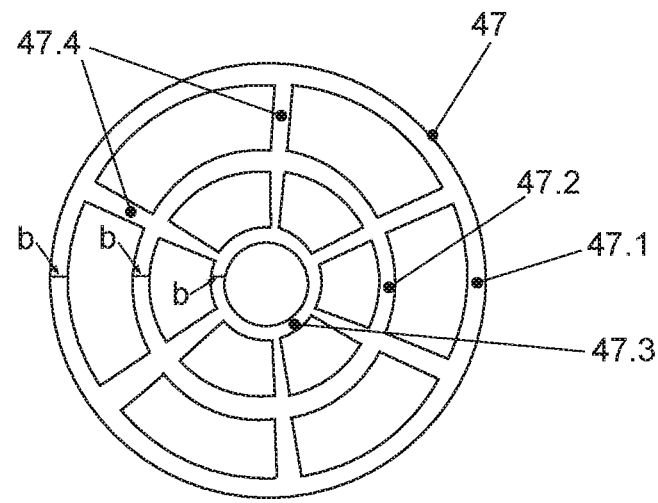
FIGS. 7a and 7b show another embodiment of a flow control means comprising a first, lower disk with concentrically arranged passage openings similar to FIG. 6a. To change the flow rate, in particular for accurate control section-by-section, a second disk in the form of a grid-like disk as shown in FIG. 7a is placed on top, the concentric annular webs of said second disk being designed in such a way that they partially cover the passage openings of the first disk in a defined manner (FIG. 7b) and thus reduce the flow rate of the filling material.
Figure 7B:
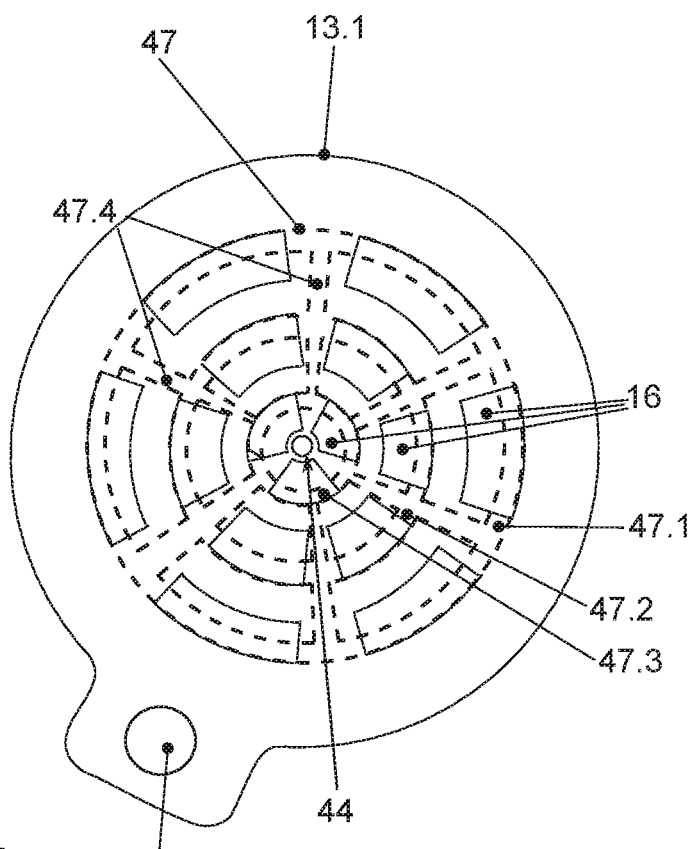

According to this embodiment, the flow control means furthermore comprises a grid-like disk or interchangeable disk 47 as illustrated in FIG. 7a. This grid-like disk 47 comprises annular, concentrically arranged annular webs 47.1 to 47.3 and radial webs 47.4. The grid-like disk 47 is arranged above the first disk 13.1 in such a way that the annular webs 47.1 to 47.3 at least partially cover the openings 14.1 of the disk, and the radial webs 47.4 rest on the webs 14.2 of the disk 13.1, as shown in FIG. 7b. For example, the grid-like disk can be designed in such a way that the outer radii of the annular webs 47.1 to 47.3 are approximately congruent with the outer radii of the fifth, third and first ring sections of the first disk 13.1, respectively, but the inner radii of the annular webs 47.1 to 47.3 are somewhat smaller and thus form webs of a defined width b.

The effective sizes of the passage openings 16 are determined by means of the widths b of the annular webs 47.1 to 47.3. Here, the widths b of the annular webs 47.1 to 47.3 can be the same or different and can be chosen in such a way that they cover 1 to 99%, e.g. 5 to 50 or 10 to 30%, of the openings 14.1. For example, the annular webs 47.1 to 47.3 cover 10 or 20% of the openings 14.1, with the result that the passages 16 then only have a size of 90 or 80% of the size of the opening 14.1. If a different percentage of the openings 14.1 is to be covered, the grid-like disk 47 is replaced with a different grid-like disk, the annular webs 47.1 to 47.3 of which have a width b corresponding to the desired degree of covering. In this way, the quantity of filling material supplied to the individual sectors of the distribution unit can be preset in accordance with requirements. It is also possible, for example, to preproduce a set of different interchangeable disks 47, from which a specific disk 47 can be selected and inserted into the device according to the invention before the start of the filling process in accordance with the significant parameters of a specific filling process, e.g. the type of particles of filling material, the filling rate, the geometry of the container to be filled (e.g. a reactor), before the start of the filling process, in this way enabling an optimum filling result to be guaranteed.

The grid-like disk 47 is preferably connected releasably to the first disk 13.1. For example, it can be secured on the disk 13.1 by means of screwed joints between the radial webs 47.4 and the webs 14.2. Another possibility consists in the formation of at least two upward-pointing pegs on disk 13.1, which engage in corresponding recesses, e.g. in the region of the outer web 47.1 of disk 47 (not shown in the figures).

Of course, the grid-like disk 47 can also be mounted under disk 13.1, but this is a less preferred option.

Figure 8:
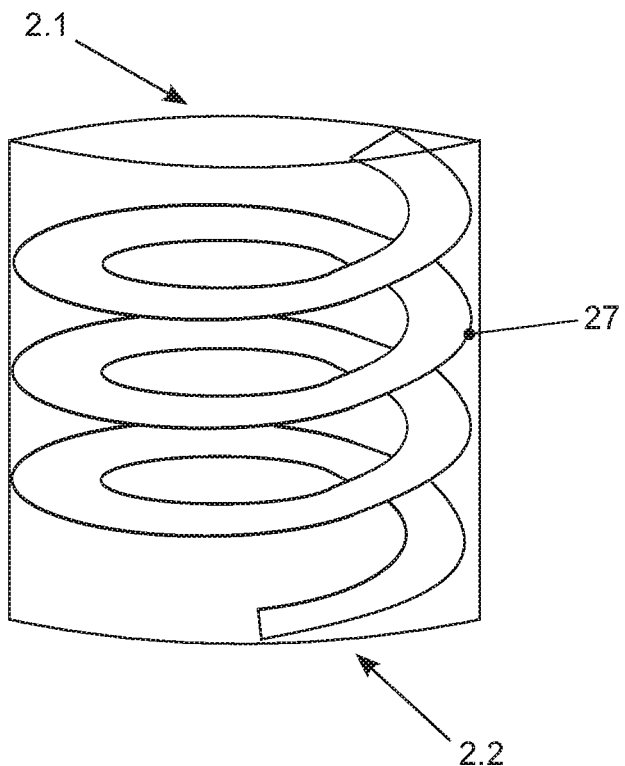
FIG. 8 shows another embodiment of the supply container of the filling device from FIG. 1, and FIGS. 9a to 9d show another advantageous embodiment of a filling device according to the invention with flexible extensions at the radial ends of the modules (FIGS. 9a and b) of the distribution unit, and illustrate the introduction thereof into the reactor to be filled (FIGS. 9c and d).

Another embodiment of the supply container 2 of the filling device 1 is shown with reference to FIG. 8. In this case, a baffle 27 is arranged within the supply container 2. Here, the baffle 27 extends from the upper opening 2.1 of the supply container 2 to the lower opening 2.2 of the supply container 2. As a result, the impact of the particulate material 28 on the flow control means 5 or the distribution unit 3 is absorbed. This in turn prevents the particulate material from being damaged in the filling device 1.

The baffle 17 is furthermore of spiral design and ensures that the particulate material slides from the upper opening 2.1 to the lower opening 2.2.

A person skilled in the art can prepare further modifications of the specific embodiments described here by following the technical teaching according to the invention.

LIST OF REFERENCE SIGNS

1 filling device
2 supply container
2.1, 2.2 openings of the supply container
3 distribution unit
4 drive unit
4.1 motor
4.2 first drive means; gearwheel
4.2a driven belt pulley
4.3 second drive means; pinion
4.3a drive belt pulley
flow control means
holding means
ball bearing
8.1, 8.2, 8,3 sector of the distribution unit
8.1a, 8.2a, 8.3a sector opening
9 separating element
10 intermediate separating element
11 outer wall
12 actuating device
12.1 servomotor
12.2 actuating wheel
12.3 shaft
12.4 pushbutton
13.1 disk, base disk
13.2', 13.2", 13.2''' opening control means
14.1 opening
14.2 web
15 notch
16 passage
17.1-17.6 ring sections of the first disk
18, 18a screw fastening points, holes
19 cover
20 wall
21 outlet opening
22.1-22.3 annular modules of the distribution unit
23 protrusions
24.1-24.3 shutters
25.1-25.3 ring sections of the second disks
26 cover
27 baffle
28 particulate material
29.1-29.3 sections of the annular modules 30 screw
31 screw
32 nut
33 screw
34 axle
35 rotary bearing
35.1 rotatable element, sleeve
35.2 ball bearing
35.3 fixing element, flange
36 fixing element
37 lower nut
38.1 disk, base disk
38.2 second disk
39.1, 40.1 openings
39.2, 40.2 webs
41 section of the additional disk
42 hole
43 base plate
44 hole
45 upper nut
46 drive belt
47 interchangeable disk, grid-like disk
47.1, 47.2, 47.3 annular webs
47.4 radial webs
48 first flexible extension
49 slot
50 inflexible section (part of the base plate 43)
51 second flexible extension
52 bristle bunch
b width of the annular webs
A rotational axis
B filling direction
M, M' central point
D1 direction of rotation
D2 direction of rotation
F1-F3 flow of the particulate material
Di1-Di3 inside diameter of the annular modules
G direction of motion

The invention claimed is:

1. A filling device (1) for filling a container with particulate material (28), comprising
a supply container (2) that can be filled with the particulate material (28), wherein the supply container (2) has a lower opening (2.2), and
a radial distribution unit (3), which can be supplied with the particulate material (28) via the lower opening (2.2) of the supply container (2) and which is connected to the supply container (2) in such a way that it can rotate about a rotational axis (A), in order to distribute in the container to be filled the particulate material (28) supplied from the supply container (2) to the distribution unit (3),
wherein the distribution unit (3) can be driven by means of a drive unit (4) that is arranged outside the supply container (2), which drive unit comprises a motor (4.1), a first (4.2, 4.2a) and a second drive means (4.3, 4.3a),
wherein the first drive means (4.2, 4.2a) is designed as a gearwheel (4.2) or driven belt pulley (4.2a), and the second drive means (4.3, 4.3a) is a pinion (4.3), which engages in the gearwheel (4.2), or a drive belt pulley (4.3a), which drives the driven belt pulley (4.2a) via a drive belt (46), thus enabling a torque of the second drive means (4.3, 4.3a) to be transmitted to the distribution unit (3) by means of the first drive means (4.2, 4.2a), and the motor (4.1) is coupled to the first drive means (4.2, 4.2a), which is rotatable about the rotational axis (A), and
wherein the first drive means (4.2, 4.2a) is connected to the distribution unit (3),
characterized in that:
the motor (4.1) of the drive unit (4) is secured on an outer wall of the supply container (2) and is arranged laterally offset with respect to the rotational axis (A) of the distribution unit (3),
the first drive means (4.2, 4.2a) is provided with ball bearing support, and
the distribution unit (3) has a multiplicity of sectors (8), wherein the sectors (8) have a multiplicity of flexible, radially outward-oriented extensions (48, 51).

2. The filling device (1) as claimed in claim 1, characterized in that the first drive means (4.2, 4.2a) is arranged between the supply container (2) and the distribution unit (3).

3. The filling device (1) as claimed in claim 1, characterized in that the multiplicity of sectors (8) are separated from one another by separating elements (9),
wherein the separating elements (9) extend radially outward with respect to the rotational axis (A), with the result that an outlet opening (21) for the particulate material (28) is formed between in each case two separating elements (9).

4. The filling device (1) as claimed in claim 3, characterized in that the sectors (8.1, 8.2, 8.3) have a sector opening (8.1a, 8.2a, 8.3a) that is open in the direction of the supply container (2), thus allowing the sectors (8) to be filled with the particulate material (28).

5. The filling device (1) as claimed in claim 4, characterized in that the distribution unit (3) is of modular construction,
wherein the distribution unit (3) has at least two concentric modules (22.1, 22.2, 22.3), which each comprise sectors (8),
wherein the modules are arranged one above the other in a stacked configuration and the outlet openings (21) of the first module (22.1) are arranged in a first, upper plane and
wherein the outlet openings (21) of the second module (22.2, 22.3) are arranged in a second, lower plane, wherein the upper module (22.1) has a larger diameter than the lower module (22.2, 22.3).

6. The filling device (1) as claimed in claim 5, characterized in that each of the modules (22.1, 22.2, 22.3) has at least one section (29.1, 29.2, 29.3) which is open in the direction of the supply container (2), thus allowing the modules (22.1, 22.2, 22.3) to be filled with the particulate material (28).

7. The filling device (1) as claimed in claim 5, characterized in that the modules (22.1, 22.2, 22.3) each have a base plate (43), wherein the separating elements (9) are set up substantially vertically on the base plates (43), thereby forming the sectors (8).

8. The filling device (1) as claimed in claim 5, characterized in that the flexible, radially outward-oriented extensions (48, 51) comprise first extensions (48), which extend substantially horizontally in a plane defined by a base plate (43) of the first (22.1) and/or second module (22.2, 22.3), and/or second extensions (51), which extend substantially perpendicularly to the plane defined by the base plate (43) of the first (22.1) and/or second module (22.2, 22.3).

9. The filling device (1) as claimed in claim 8, characterized in that the first extensions (48) are arranged at the outer edge of the base plate (43) of the first (22.1) and/or second module (22.2, 22.3).

10. The filling device (1) as claimed in claim 8, characterized in that the second extensions (51) are arranged at the outer edge of the separating elements (9).

11. The filling device (1) as claimed in claim 8, characterized in that the extensions (48, 51) are manufactured from a flexible material.

12. The filling device (1) as claimed in claim 9, characterized in that the first extensions (48) form a flexible single- or multi-piece outer ring around the first (22.1) and/or second module (22.2, 22.3).

13. The filling device (1) as claimed in claim 9, characterized in that the first extensions (48) are of tab-type design and/or the second extensions (51) are of brush-type design.

14. The filling device (1) as claimed in claim 1, characterized in that the filling device (1) comprises at least one means (5), arranged between the supply container (2) and the distribution unit (3), for controlling a flow of the particulate material (28) to the distribution unit (3).

15. The filling device (1) as claimed in claim 14, characterized in that the flow control means (5) comprises a disk (13.1, 38.1) having at least one opening (14.1, 39), wherein the disk (13.1, 38.1) forms a base of the supply container (2), which is arranged at the lower opening (2.2) of the supply container (2).

16. The filling device (1) as claimed in claim 14, characterized in that the flow control means (5) comprises an opening control means (38.2), which can be moved relative to a disk (38.1) and by means of which the opening (39.1) can be covered in such a way that a variable passage (16) is formed, through which the particulate material (28) can be supplied to the sectors (8) of the distribution unit (3).

17. The filling device (1) as claimed in claim 16, characterized in that the opening control means (38.2) comprises a second disk having at least one opening (40.1) and at least one web (40.2), wherein the opening (39.1) of the disk (38.1) can be at least partially covered by means of the web (40.2) of the second disk (38.2).

18. The filling device (1) as claimed in claim 14, characterized in that the flow control means (5) comprises:
a disk (13.1) having at least one opening (14.1), wherein the disk (13.1) forms a base of the supply container (2), which is arranged at the lower opening (2.2) of the supply container (2); and
a grid-like disk (47), which partially covers at least one opening (14.1) of the disk (13.1).

19. The filling device (1) as claimed in claim 14, characterized in that:
the flow control means (5) comprises at least one actuating unit (12), wherein the actuating unit (12) comprises a servomotor (12.1), which drives a rotatable actuating wheel (12.2), and
the opening control means (38.2) comprises at least one section (41) which has notches (15), into which the actuating wheel (12.2) engages, wherein the position of the opening control means (38.2) relative to the opening (39.1) of the disk (38.1) can be changed by rotating the actuating wheel (12.2).

20. A method for filling a container with a particulate material using a filling device (1) as claimed in claim 1.

* * * * *